United States Patent
Han et al.

(10) Patent No.: US 11,063,531 B2
(45) Date of Patent: Jul. 13, 2021

(54) SERIES CONNECTED DC INPUT INVERTERS

(71) Applicant: Wisconsin Alumni Research Foundation, Madison, WI (US)

(72) Inventors: Yehui Han, Madison, WI (US); Jiyao Wang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1034 days.

(21) Appl. No.: 14/181,085

(22) Filed: Feb. 14, 2014

(65) Prior Publication Data
US 2015/0236634 A1 Aug. 20, 2015

(51) Int. Cl.
*H02M 7/49* (2007.01)
*H02P 5/74* (2006.01)
*H02K 11/33* (2016.01)
*H02M 1/00* (2006.01)

(52) U.S. Cl.
CPC .............. *H02M 7/49* (2013.01); *H02K 11/33* (2016.01); *H02P 5/74* (2013.01); *H02M 2001/0074* (2013.01)

(58) Field of Classification Search
USPC ....................................................... 318/724
See application file for complete search history.

(56) References Cited

U.S. PATENT DOCUMENTS

| 3,792,286 A | * | 2/1974 | Meier | ..................... H02M 7/49 307/32 |
| 4,326,157 A | * | 4/1982 | Herbert | ............... H02P 23/0095 318/729 |
| 5,666,278 A | * | 9/1997 | Ng | .......................... H02M 7/49 363/65 |
| 9,006,930 B2 | * | 4/2015 | Jang | .......................... H02J 4/00 307/82 |

(Continued)

OTHER PUBLICATIONS

Rodriguez et al. (J. Rodriguez, Jih-Sheng Lai and Fang Zheng Peng, "Multilevel inverters: a survey of topologies, controls, and applications," in IEEE Transactions on Industrial Electronics, vol. 49, No. 4, pp. 724-738, Aug 2002. URL: http://ieeexplore.ieee.org/stamp/stamp.jsp?tp=&arnumber=1021296&isnumber=21973).*

(Continued)

*Primary Examiner* — Said Bouziane
(74) *Attorney, Agent, or Firm* — Bell & Manning, LLC

(57) ABSTRACT

A multi-level converter includes a first multi-phase inverter and a second multi-phase inverter. The first multi-phase inverter includes a first direct current (DC) positive line, a first DC negative line, and a first plurality of alternating current (AC) lines. Each AC line of the first plurality of AC lines is configured to be connected to a single phase winding of an electric machine. Each single phase winding is connected to a common neutral connector in a Y-winding configuration or between a pair of single phase windings in a Δ-winding configuration. The second multi-phase inverter includes a second DC positive line, a second DC negative line, and a second plurality of AC lines and is connected in (Continued)

a similar manner to the first multi-phase inverter. The first DC negative line is electrically coupled to the second DC positive line to connect the first multi-phase inverter and the second multi-phase inverter in series.

18 Claims, 16 Drawing Sheets

(56) References Cited

U.S. PATENT DOCUMENTS

| | | | | |
|---|---|---|---|---|
| 2011/0198936 A1* | 8/2011 | Graovac | ................ | H02M 7/79 |
| | | | | 307/82 |
| 2014/0002002 A1* | 1/2014 | Barza | ...................... | B25F 5/00 |
| | | | | 318/724 |
| 2015/0200602 A1* | 7/2015 | Narimani | ............ | H02M 5/4585 |
| | | | | 363/37 |

OTHER PUBLICATIONS

Kieferndorf et al., A New Medium Voltage Drive System Based on ANPC-5L Technology, IEEE, 2010, pp. 643-649.
Aoki et al., Distributed Active Transformer—A New Power-Combining and Impedance-Transformation Technique, IEEE Transactions on Microwave Theory and Techniques, vol. 50, No. 1, Jan. 2002, pp. 316-331.
Jang et al., Input-Voltage Balancing of Series-Connected Converters, IEEE, 2011, pp. 1153-1160.
Power inverter, Downloaded from http://en.wikipedia.org/wiki/Inverter on Jan. 24, 2014, pp. 1-13.

* cited by examiner

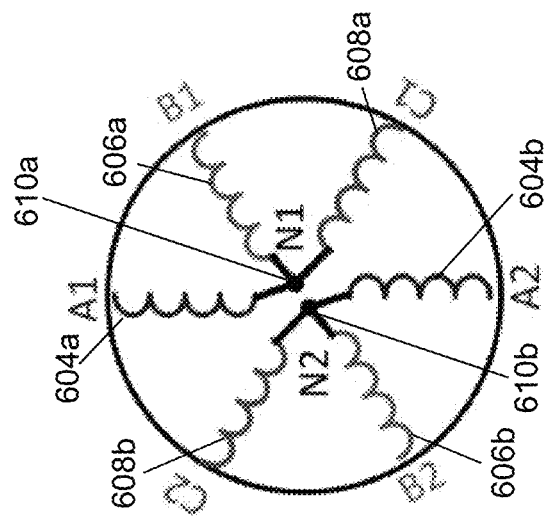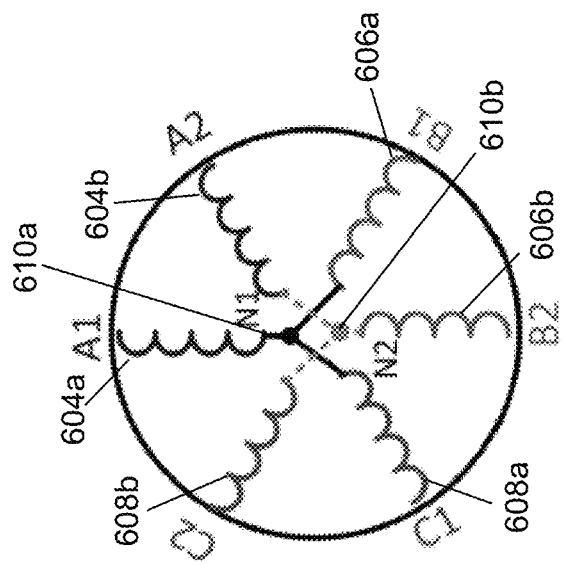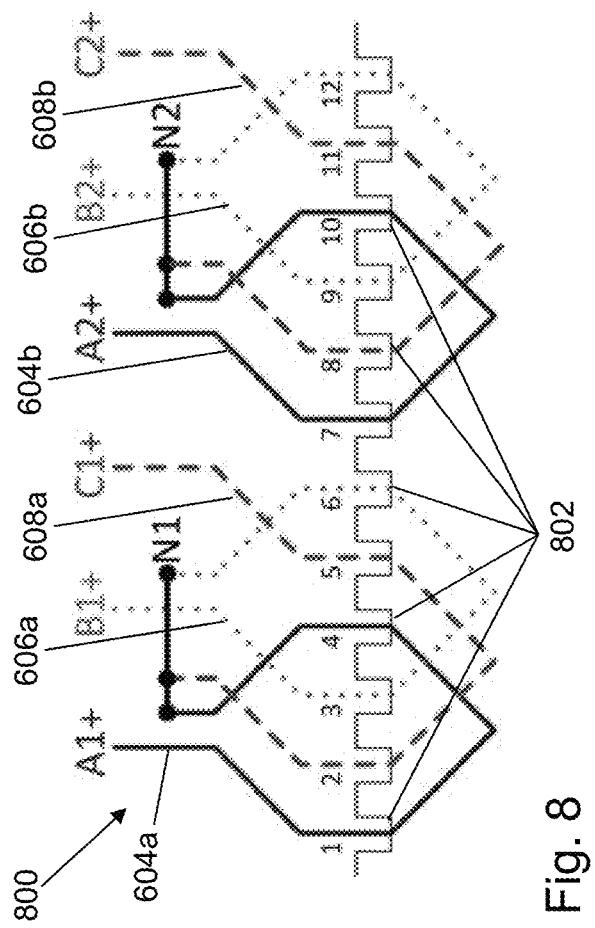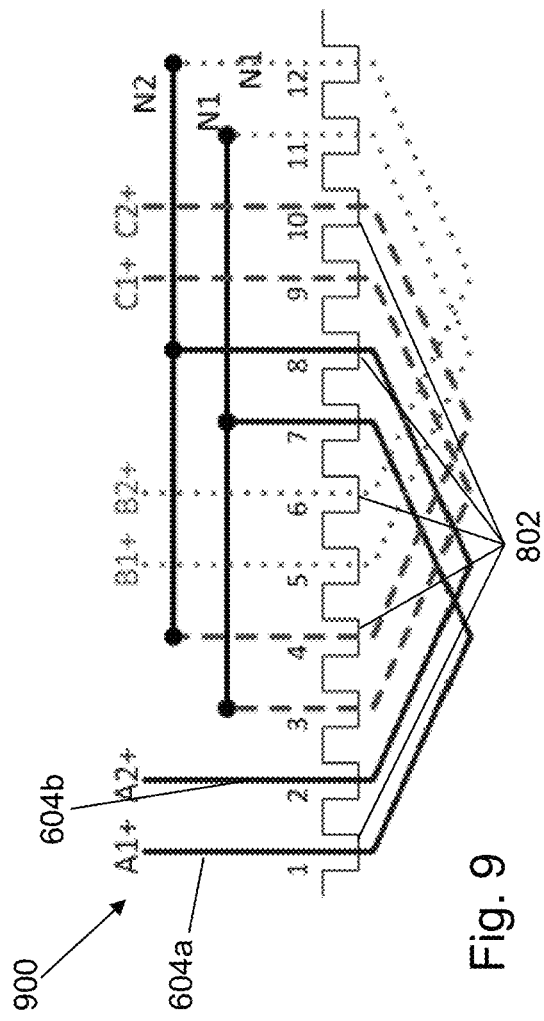
Fig. 8
Fig. 9

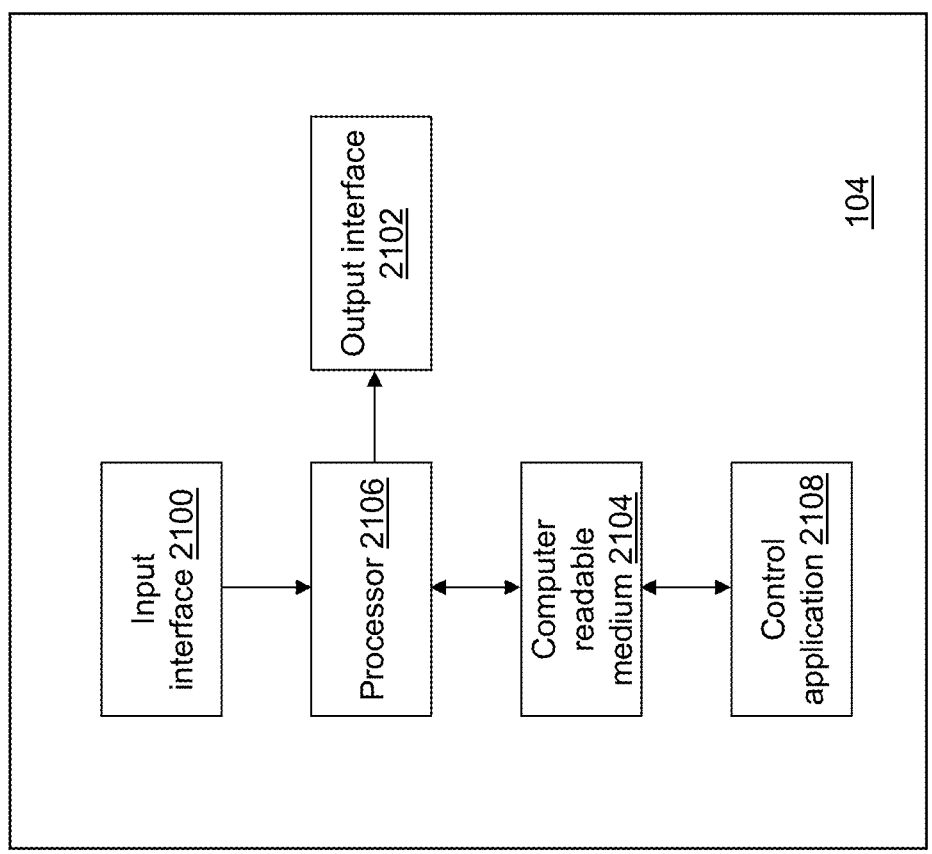

SERIES CONNECTED DC INPUT INVERTERS

BACKGROUND

There has been increasing attention given to the efficiency of energy conversion. Electric motors utilize 45 per cent of global electricity. Increased energy efficiency in electric motors will provide the U.S. with tremendous economic, environmental, human ecological, and security benefits.

An adjustable speed drive (ASD) is a power electronics device that controls the speed of machinery. ASDs also save energy for industry processes that require adjustable speed or control of flow from a fan or pump. ASDs have already replaced many conventional fixed speed drives in low-power and low-voltage applications such as air conditioners, washing machines, electric bicycles, and vehicles with stepless speed change. For high-power and medium-voltage (MV) applications, including industrial air compressors, water pumping stations, cooling fans, railway traction systems, steel rolling mills, marine propulsion, and renewable energy systems, ASDs are even more attractive because the cost saving of electric power is even more significant than it is in low-voltage and low-power applications.

SUMMARY

In an example embodiment, a converter is provided. The converter includes, but is not limited to, a first multi-phase inverter and a second multi-phase inverter. The first multi-phase inverter includes, but is not limited to, a first direct current (DC) positive line, a first DC negative line, and a first plurality of alternating current (AC) lines. Each AC line of the first plurality of AC lines is configured to be connected to a single phase winding of an electric machine. Each single phase winding is connected to a common neutral connector. The second multi-phase inverter includes, but is not limited to, a second DC positive line, a second DC negative line, and a second plurality of AC lines. Each AC line of the second plurality of AC lines is configured to be connected to a second single phase winding of the electric machine. Each second single phase winding is connected to a second common neutral connector. The common neutral connector is different from the second common neutral connector. The first DC negative line is electrically coupled to the second DC positive line to connect the first multi-phase inverter and the second multi-phase inverter in series.

In another example embodiment, a converter is provided. The converter includes, but is not limited to, a first multi-phase inverter and a second multi-phase inverter. The first multi-phase inverter includes, but is not limited to, a first DC positive line, a first DC negative line, and a first plurality of AC lines. Each AC line of the first plurality of AC lines is configured to be connected between a different pair of single phase windings of an electric machine. The second multi-phase inverter includes, but is not limited to, a second DC positive line, a second DC negative line, and a second plurality of AC lines. Each AC line of the second plurality of AC lines is configured to be connected between a different pair of second single phase windings of the electric machine. The first DC negative line is electrically coupled to the second DC positive line to connect the first multi-phase inverter and the second multi-phase inverter in series.

In yet another example embodiment, an electric machine is provided. The electric machine includes, but is not limited to, stator, a rotor configured to rotate, and at least four windings, a first multi-phase inverter, and a second multi-phase inverter. A first winding is connected between a first-phase line and a first neutral connector. A second winding is connected between a second-phase line and the first neutral connector. A third winding is connected between a second first-phase line and a second neutral connector. A fourth winding is connected between a second second-phase line and the second neutral connector. The first neutral connector is different from the second neutral connector. The first multi-phase inverter includes, but is not limited to, a first DC positive line, a first DC negative line, and at least the first-phase line and the second-phase line. The second multi-phase inverter includes, but is not limited to, a second DC positive line, a second DC negative line, and at least the second first-phase line and the second second-phase line. The first DC negative line is electrically coupled to the second DC positive line to connect the first multi-phase inverter and the second multi-phase inverter in series.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 8 depicts a first winding configuration of the electric machine system of FIG. 1 in accordance with an illustrative embodiment.

FIG. 9 depicts a second winding configuration of the electric machine system of FIG. 1 in accordance with an illustrative embodiment.

FIG. 21 depicts a block diagram of a controller of the electric machine system of FIG. 1 in accordance with an illustrative embodiment.

DETAILED DESCRIPTION

Figure 1:
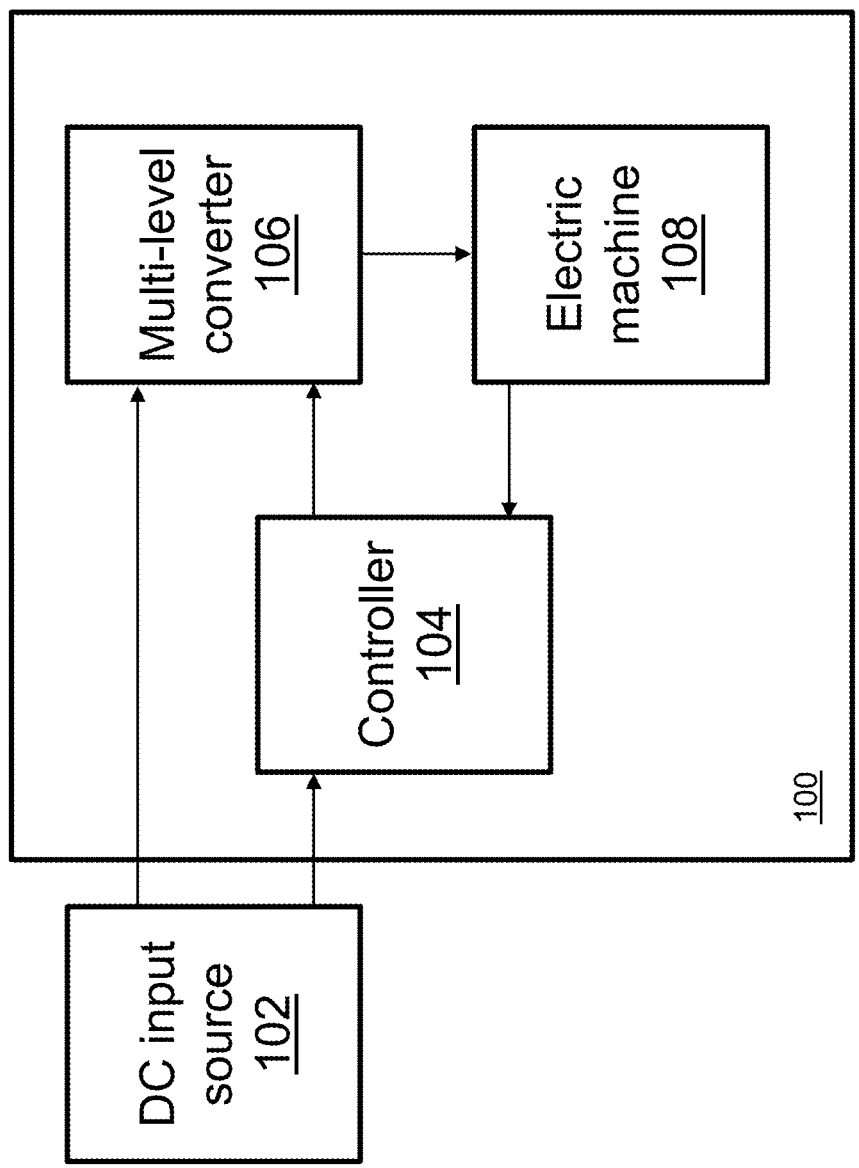
FIG. 1 is a block diagram of an electric machine system connected to an input source in accordance with an illustrative embodiment.

Referring to FIG. 1, an electric machine system 100 may include a controller 104, a multi-level converter 106, and an electric machine 108. Electric machine 108 may be a motor such as an induction or a synchronous motor including permanent magnet machines. A direct current (DC) input source 102 is electrically connected to controller 104 and to multi-level converter 106. DC input source 102 can be by one or more DC source. DC input source 102 may be a DC grid, batteries, a dc output of a single-phase or multi-phase passive or active rectifier, etc. that provides approximately constant instantaneous power flow.

DC input source 102 provides DC power and DC input source measured signals to controller 104. DC input source 102 provides DC power to multi-level converter 106. Multi-level converter 106 provides alternating current (AC) power to electric machine 108.

Controller 104 is electrically connected to DC input source 102, multi-level converter 106, and electric machine 108. Controller 104 controls the supply of power by multi-level converter 106 to electric machine 108 through command signals input to multi-level converter 106. The command signals are generated by controller 104 based on the DC input source measured signals received from DC input source 102 and signals measured and received from electric machine 108. In an illustrative embodiment, controller 104 implements a closed loop current control to determine the command signals.

Multi-level converter 106 converts DC power from DC input source 102 to the AC power supplied to electric machine 108. Controller 104 and multi-level converter 106 can be incorporated inside a housing of electric machine 108.

Figure 2:
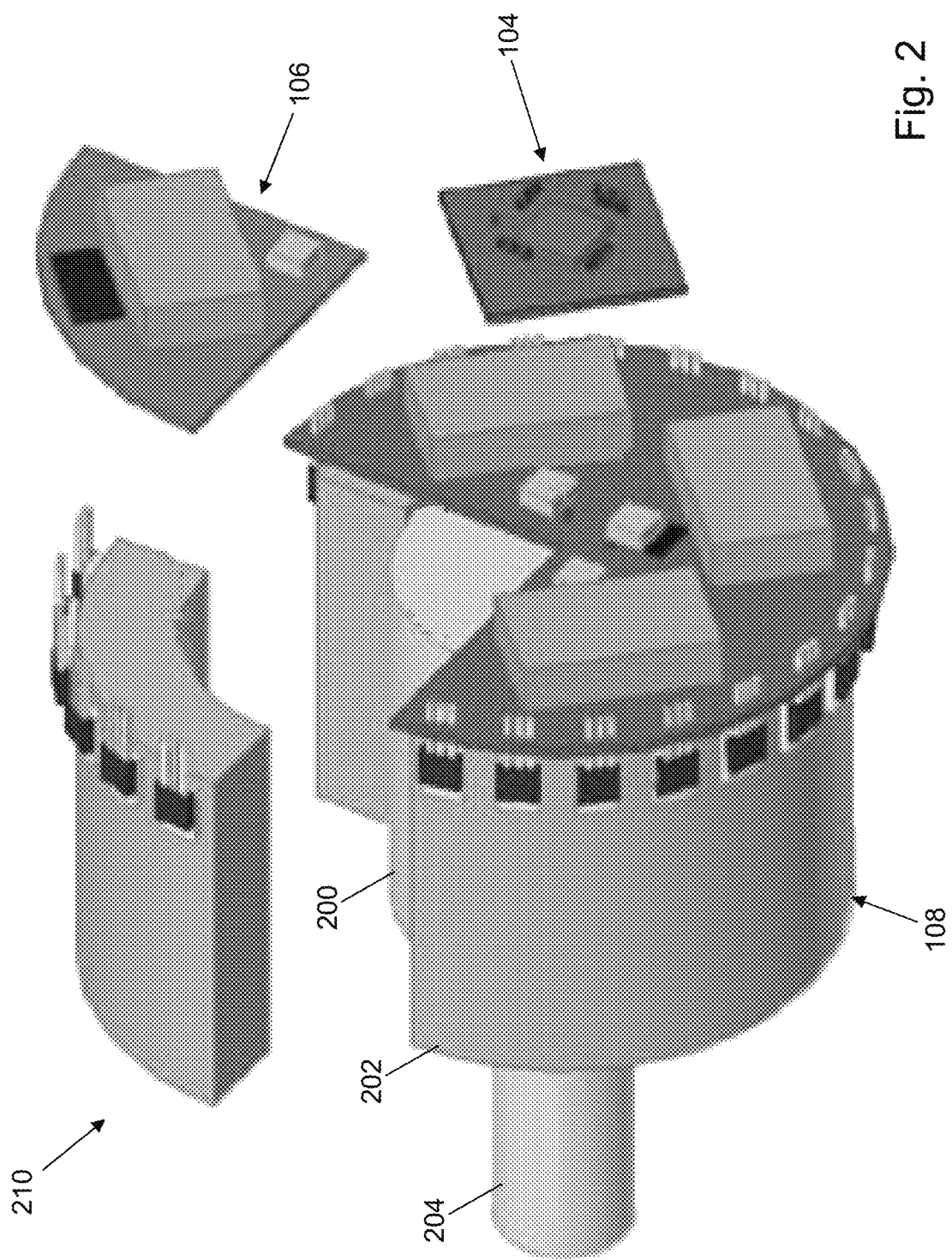
FIG. 2 depicts the electric machine system of FIG. 1 in accordance with an illustrative embodiment.

Referring to FIG. 2, an AC motor 210 is shown in accordance with an illustrative embodiment. AC motor 210 is merely an example of electric machine 108. AC motor 210 may include a rotor 200 and a stator 202 with associated windings (not shown) in various arrangements as understood by a person of skill in the art. AC motor 210 may be an AC electric motor in which the electric current in a rotor winding needed to produce torque is induced by electromagnetic induction from a magnetic field formed by a current in a stator winding. Rotor 200 of AC motor 210 may be either wound type, squirrel-cage type, etc. AC motor 210 further may be configured to have any size rating.

Figure 3:
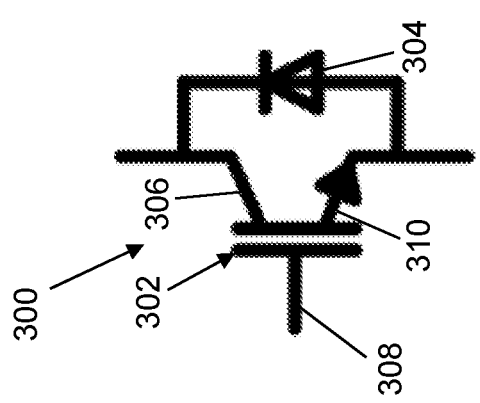
FIG. 3 depicts a switch-diode circuit in accordance with an illustrative embodiment.

Referring to FIG. 3, a switch-diode circuit 300 is shown in accordance with an illustrative embodiment. Switch-diode circuit 300 may include a transistor switch 302 and a diode 304. Transistor switch 302 may include a drain 306, a gate 308, and a source 310 like a metal-oxide-semiconductor field-effect transistor (MOSFET) or include a collector 306, a gate 308, and an emitter 310 like an insulated-gate bipolar transistor (IGBT), or include a collector 306, a base 308, and an emitter 310 like a bipolar junction transistor. Depending on the switching logic and whether transistor switch 302 is an n-type or a p-type, drain 306 and source 310 may be reversed. A voltage applied to gate 308 determines a switching state of transistor switch 302. Diode 304 is connected anti-parallel across source 310 and drain 306 of transistor switch 302. In an illustrative embodiment, transistor switch 302 is an insulated-gate field-effect transistor such as a MOSFET, IGBT, Gallium Nitride (GaN) device, Silicon Carbide (SiC) device, or other type of power semiconductor switch.

Figure 4:
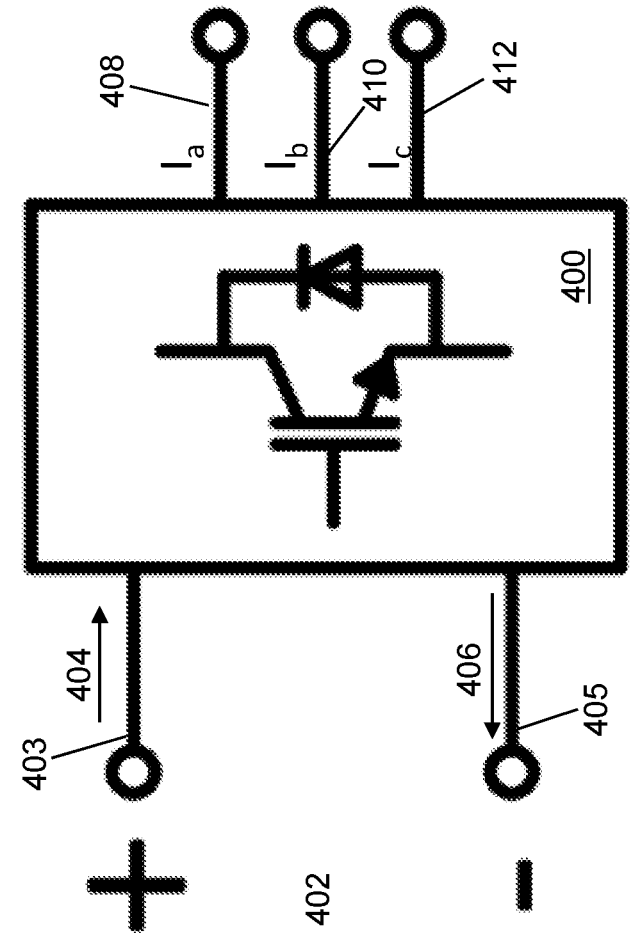
FIG. 4 is a block diagram of a 3-phase inverter of the electric machine system of FIG. 1 in accordance with an illustrative embodiment.

Referring to FIG. 4, a block diagram of a multi-phase inverter 400 is shown in accordance with an illustrative embodiment. $\Delta V_{dc}$ 402 is applied across a positive line 403 and a negative line 405. An input current 404 is provided through positive line 403, and an output current 406 is provided through negative line 405. $V_{dc}$ 402 represents the voltage from DC input source 102 if multi-level converter 106 included a single multi-phase inverter. In the illustrative embodiment, multi-phase inverter 400 outputs a first phase current $I_a$ through a first-phase line 408, a second phase current $I_b$ through a second-phase line 410, and a third phase current $I_c$ through a third-phase line 412. First-phase line 408, second-phase line 410, and third-phase line 412 are AC current lines that provide AC power to electric machine 108. In the illustrative embodiment, multi-phase inverter 400 is a three-phase inverter though a different number of phases may be output from multi-phase inverter 400 in alternative embodiments. For example, multi-phase inverter 400 may output two- or four-phase currents.

Figure 5:
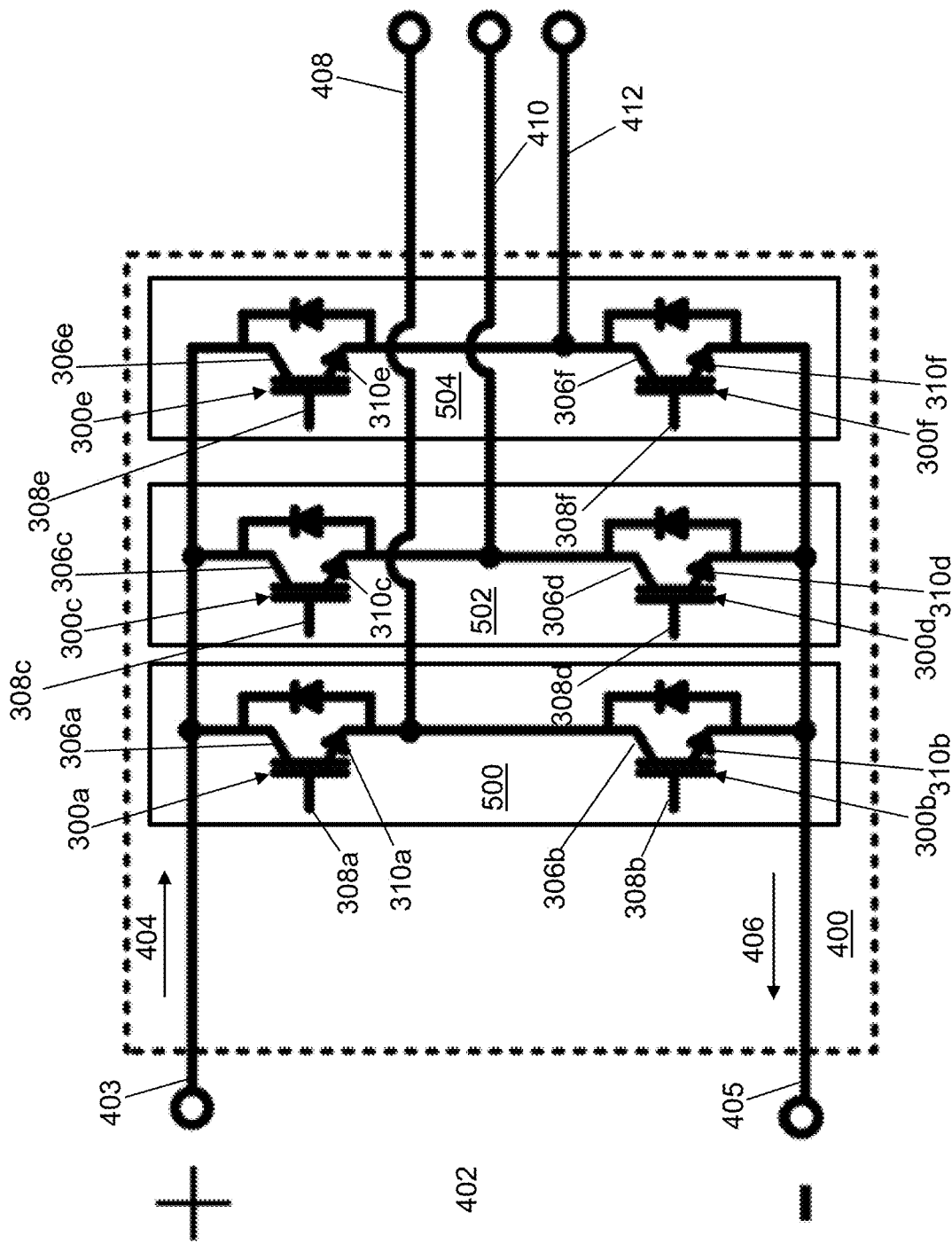
FIG. 5 is a circuit diagram of the 3-phase inverter of FIG. 4 in accordance with an illustrative embodiment.

Referring to FIG. 5, a circuit diagram of multi-phase inverter 400 implemented as a three-phase inverter is shown in accordance with an illustrative embodiment. Multi-phase inverter 400 may include a first half-bridge 500, a second half-bridge 502, and a third half-bridge 504. First half-bridge 500 includes a first switch-diode circuit 300a and a second switch-diode circuit 300b. In the illustrative embodiment, source 310a of first switch-diode circuit 300a is connected to drain 306b of second switch-diode circuit 300b. Drain 306a of first switch-diode circuit 300a is connected to positive line 403. Source 310b of second switch-diode circuit 300b is connected to negative line 405. Gate 308a of first switch-diode circuit 300a and gate 308b of second switch-diode circuit 300b are connected to controller 104 to receive gating signals to control a state of first switch-diode circuit 300a and second switch-diode circuit 300b, respectively. First-phase line 408 is connected between source 310a of first switch-diode circuit 300a and drain 306b of second switch-diode circuit 300b.

A half-bridge is included for each phase current output from multi-phase inverter 400. Second half-bridge 502 is identical to first half-bridge 500 and includes a third switch-diode circuit 300c and a fourth switch-diode circuit 300d. In the illustrative embodiment, source 310c of third switch-diode circuit 300c is connected to drain 306d of fourth switch-diode circuit 300d. Drain 306c of third switch-diode circuit 300c is connected to positive line 403. Source 310d of fourth switch-diode circuit 300d is connected to negative line 405. Gate 308c of third switch-diode circuit 300c and gate 308d of fourth switch-diode circuit 300d are connected to controller 104 to receive gating signals to control a state of third switch-diode circuit 300c and fourth switch-diode circuit 300d, respectively. Second-phase line 410 is connected between source 310c of third switch-diode circuit 300c and drain 306d of fourth switch-diode circuit 300d.

Third half-bridge 504 is identical to first half-bridge 500 and includes a fifth switch-diode circuit 300e and a sixth switch-diode circuit 300f. In the illustrative embodiment, source 310e of fifth switch-diode circuit 300e is connected to drain 306f of sixth switch-diode circuit 300f. Drain 306e of fifth switch-diode circuit 300e is connected to positive line 403. Source 310f of sixth switch-diode circuit 300f is connected to negative line 405. Gate 308e of fifth switch-diode circuit 300e and gate 308f of sixth switch-diode circuit 300f are connected to controller 104 to receive gating signals to control a state of fifth switch-diode circuit 300e and sixth switch-diode circuit 300f, respectively. Third-phase line 412 is connected between source 310e of fifth switch-diode circuit 300e and drain 306f of sixth switch-diode circuit 300f.

Figure 6:
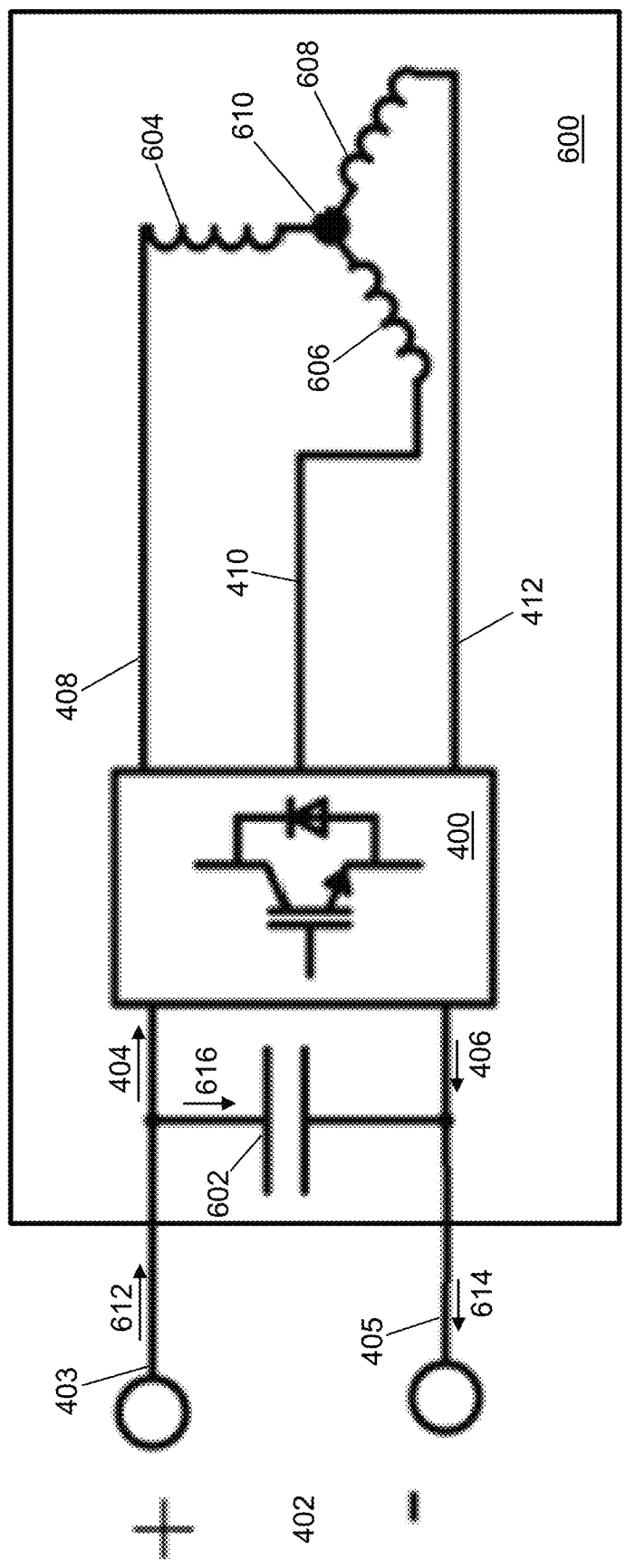
FIG. 6 depicts a single converter module with a Y winding connection in accordance with an illustrative embodiment.

Referring to FIG. 6, a single converter module 600 is shown in accordance with an illustrative embodiment. Single converter module 600 may include a capacitor 602, multi-phase inverter 400, a first-phase machine winding 604, a second-phase machine winding 606, and a third-phase machine winding 608. First-phase machine winding 604, second-phase machine winding 606, and third-phase machine winding 608 are windings of electric machine 108. First-phase machine winding 604, second-phase machine winding 606, and third-phase machine winding 608 are connected in a Y-winding configuration. Capacitor 602 is connected across a DC side of multi-phase inverter 400 between positive line 403 and negative line 405. Thus, capacitor 602 is connected in parallel with first half-bridge 500, second half-bridge 502, and third half-bridge 504.

A first converter input current 612 is input to single converter module 600. A capacitor current 616 is a first portion of first converter input current 612 that flows through capacitor 602. Input current 404 is a remaining portion of first converter input current 612. A first converter output current 614 is output from single converter module 600 and equals output current 406 and capacitor current 616 after flowing through capacitor 602.

First-phase machine winding 604 is supplied $I_a$ through first-phase line 408. Second-phase machine winding 606 is supplied $I_b$ through second-phase line 410. Third-phase machine winding 608 is supplied $I_c$ through third-phase line 412.

First-phase machine winding 604, second-phase machine winding 606, and third-phase machine winding 608 are tied together at a connector 610. Connector 610 is a common neutral connector between first-phase machine winding 604, second-phase machine winding 606, and third-phase machine winding 608. As understood by a person of skill in the art, the currents applied to the machine windings are 360/m degrees out of phase with each other, where m represents a number of phases. Thus, $I_a$, $I_b$, and $I_c$ are 120 degrees out of phase with each other.

Electric machine 108 is a magnetic component and its windings are magnetically coupled with inherent electrical isolation. Single converter module 600 can utilize the windings of electric machine 108, stator or rotor as coupling transformers, inductors, or filters to achieve a multilevel output. The output ports can be connected to different machine windings. Thus, the output voltages are synthesized inside electric machine 108.

Figure 7:
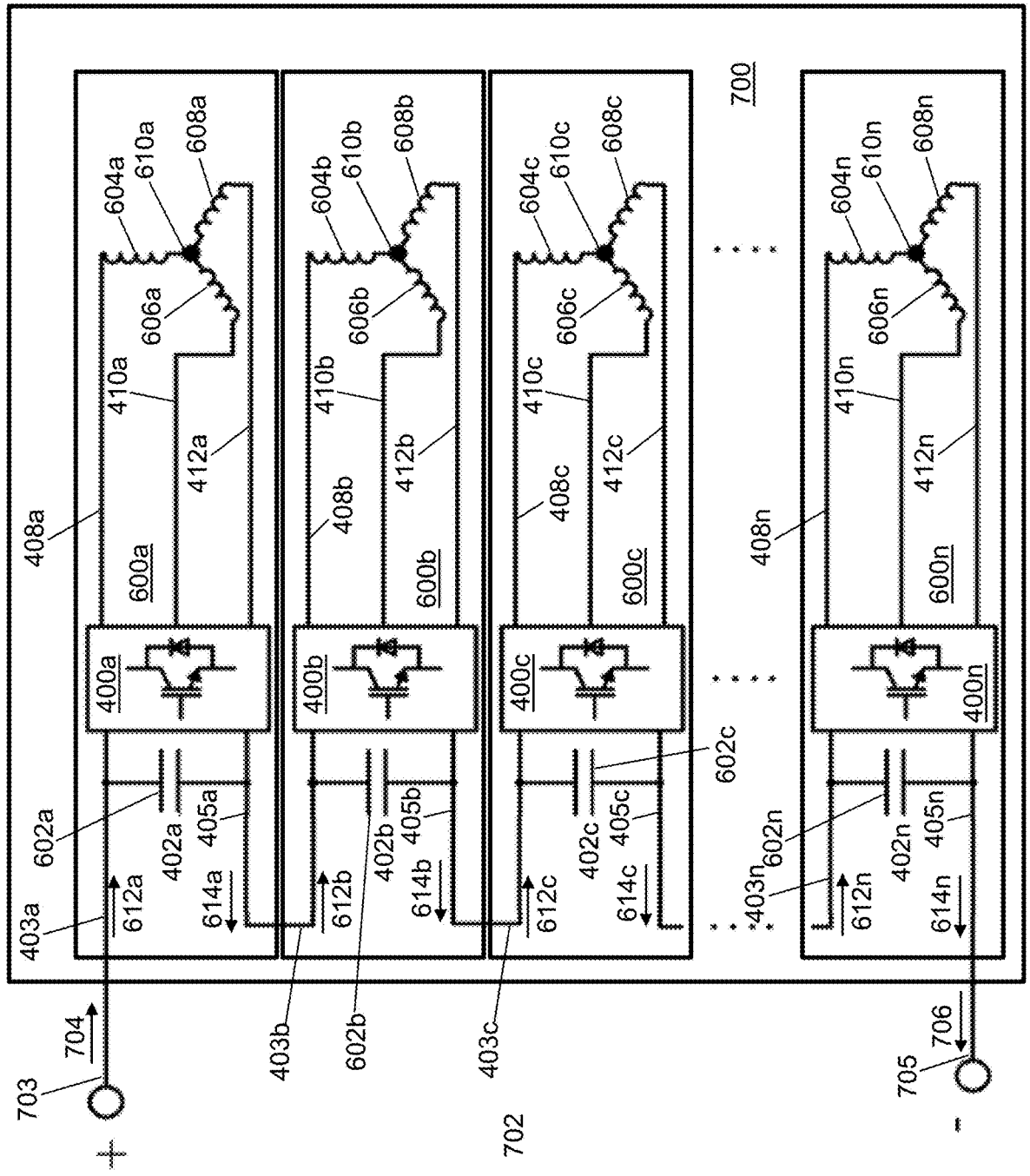
FIG. 7 depicts a multi-level converter module in accordance with an illustrative embodiment.

Referring to FIG. 7, a multi-level converter module 700 is shown in accordance with an illustrative embodiment. Multi-level converter module 700 may include a plurality of single converter modules. Multi-level converter module 700 may include any number of single converter modules. For example, multi-level converter module 700 may include a first single converter module 600a, a second single converter module 600b, a third single converter module 600c, . . . , and an $N^{th}$ single converter module 600n. Identical gate signal commands can be applied to each single converter module enabling a fully modular design.

First single converter module 600a may include a first capacitor 602a, a first multi-phase inverter 400a, a first, first-phase machine winding 604a, a first, second-phase machine winding 606a, and a first, third-phase machine winding 608a. First capacitor 602a is connected across a DC side of first multi-phase inverter 400a between a first positive line 403a and a first negative line 405a. First, first-phase machine winding 604a is supplied $I_a$ through a first, first-phase line 408a. First, second-phase machine winding 606a is supplied $I_b$ through a first, second-phase line 410a. First, third-phase machine winding 608a is supplied $I_c$ through a first, third-phase line 412a. First, first-phase machine winding 604a, first, second-phase machine winding 606a, and first, third-phase machine winding 608a are tied together at a first connector 610a. First, first-phase machine winding 604a, first, second-phase machine winding 606a, and first, third-phase machine winding 608a are windings of electric machine 108.

Second single converter module 600b may include a second capacitor 602b, a second multi-phase inverter 400b, a second, first-phase machine winding 604b, a second, second-phase machine winding 606b, and a second, third-phase machine winding 608b. Second capacitor 602b is connected across a DC side of second multi-phase inverter 400b between a second positive line 403b and a second negative line 405b. Second, first-phase machine winding 604b is supplied $I_a$ through a second, first-phase line 408b. Second, second-phase machine winding 606b is supplied $I_b$ through a second, second-phase line 410b. Second, third-phase machine winding 608b is supplied $I_c$ through a second, third-phase line 412b. Second, first-phase machine winding 604b, second, second-phase machine winding 606b, and second, third-phase machine winding 608b are tied together at a second connector 610b. Second, first-phase machine winding 604b, second, second-phase machine winding 606b, and second, third-phase machine winding 608b are windings of electric machine 108.

Third single converter module 600c may include a third capacitor 602c, a third multi-phase inverter 400c, a third, first-phase machine winding 604c, a third, second-phase machine winding 606c, and a third, third-phase machine winding 608c. Third capacitor 602c is connected across a DC side of third multi-phase inverter 400c between a third positive line 403c and a third negative line 405c. Third, first-phase machine winding 604c is supplied $I_a$ through a third, first-phase line 408c. Third, second-phase machine winding 606c is supplied $I_b$ through a third, second-phase line 410c. Third, third-phase machine winding 608c is supplied $I_c$ through a third, third-phase line 412c. Third, first-phase machine winding 604c, third, second-phase machine winding 606c, and third, third-phase machine winding 608c are tied together at a third connector 610c. Third, first-phase machine winding 604c, third, second-phase machine winding 606c, and third, third-phase machine winding 608c are windings of electric machine 108.

$N^{th}$ single converter module 600n may include an $N^{th}$ capacitor 602n, an $N^{th}$ multi-phase inverter 400n, an $N^{th}$, first-phase machine winding 604n, an $N^{th}$, second-phase machine winding 606n, and an $N^{th}$, third-phase machine winding 608n. $N^{th}$ capacitor 602n is connected across a DC side of $N^{th}$ multi-phase inverter 400n between an $N^{th}$ positive line 403n and an $N^{th}$ negative line 405n. $N^{th}$, first-phase machine winding 604n is supplied $I_a$ through an $N^{th}$, first-phase line 408n. $N^{th}$, second-phase machine winding 606n is supplied $I_b$ through an $N^{th}$, second-phase line 410n. $N^{th}$, third-phase machine winding 608n is supplied $I_c$ through an $N^{th}$, third-phase line 412n. $N^{th}$, first-phase machine winding 604n, $N^{th}$, second-phase machine winding 606n, and $N^{th}$, third-phase machine winding 608n are tied together at an $N^{th}$ connector 610n. $N^{th}$, first-phase machine winding 604n, $N^{th}$, second-phase machine winding 606n, and $N^{th}$, third-phase machine winding 608n are windings of electric machine 108.

A first $V_{dc}$ 402a is applied across first positive line 403a and first negative line 405a. A first input current 612a is provided through first positive line 403a to first single converter module 600a, and a first output current 614a is provided through first negative line 405a from first single converter module 600a. First $V_{dc}$ 402a represents the voltage from DC input source 102 applied to first single converter module 600a.

A second $V_{dc}$ 402b is applied across second positive line 403b and second negative line 405b. A second input current 612b is provided through second positive line 403b to second single converter module 600b, and a second output current 614b is provided through second negative line 405b from second single converter module 600b. Second $V_{dc}$ 402b represents the voltage from DC input source 102 applied to second single converter module 600b.

A third $V_{dc}$ 402c is applied across third positive line 403c and third negative line 405c. A third input current 612c is provided through third positive line 403c to third single converter module 600c, and a third output current 614c is provided through third negative line 405c from third single converter module 600c. Third $V_{dc}$ 402c represents the voltage from DC input source 102 applied to third single converter module 600c.

A $N^{th}$ $V_{dc}$ 402n is applied across $N^{th}$ positive line 403n and $N^{th}$ negative line 405n. A $N^{th}$ input current 612n is provided through $N^{th}$ positive line 403n to $N^{th}$ single converter module 600n, and a $N^{th}$ output current 614n is provided through $N^{th}$ negative line 405n from $N^{th}$ single converter module 600n. $N^{th}$ $V_{dc}$ 402n represents the voltage from DC input source 102 applied to $N^{th}$ single converter module 600n.

An overall positive line 703 is connected to provide a total input current 704 to multi-level converter module 700. Total input current 704 is input on first positive line 403a. An overall negative line 705 is connected to provide a total output current 706 from multi-level converter module 700. Total output current 706 is output on $N^{th}$ negative line 405n. An input voltage $V_{dc\text{-}tot}$ 702 is applied across multi-level converter module 700. Input voltage $V_{dc\text{-}tot}$ 702 is a sum of first $V_{dc}$ 402a, second $V_{dc}$ 402b, third $V_{dc}$ 402c, ..., and $N^{th}$ $V_{dc}$ 402n because first single converter module 600a, second single converter module 600b, third single converter module 600c, ..., and $N^{th}$ single converter module 600n are connected in series. As a result, first output current 614a of first single converter module 600a is second input current 612b of second single converter module 600b; second output current 614b of second single converter module 600b is third input current 612c of third single converter module 600c; ...; third output current 614c of third single converter module 600c is $N^{th}$ input current 614n of $N^{th}$ single converter module 600n. Input voltage $V_{dc\text{-}tot}$ 702 is provided by DC input source 102.

Multi-level converter module 700 can accommodate a wide range of voltage levels and power ratings. The single converter modules are connected in series to reduce the input voltage, first $V_{dc}$ 402a, second $V_{dc}$ 402b, third $V_{dc}$ 402c, ..., and $N^{th}$ $V_{dc}$ 402n across each single converter module 600a, 600b, 600c, ..., 600n to $V_{dc\text{-}tot}$/N, where N is a number of the plurality of single converter modules. This reduces the voltage stresses on the single converter modules allowing for the use of low-voltage, less-expensive circuit components. This further reduces the insulation burden between windings allowing electrical machine 108 to be smaller and less expensive. In an illustrative embodiment, $V_{dc\text{-}tot}$ is approximately constant.

Detection of machine faults in electric machine 108 can be determined quickly and accurately by measuring the inverter input or output voltage or current. When one single converter module 600 is in a fault condition, the voltage of this module drops to zero and the voltage of the remaining modules increases from $V_{dc\text{-}tot}$/N to $V_{dc\text{-}tot}$/(N−1), where N−1 is a number of the remaining modules. In this way, multi-level converter module 700 can operate without shutting down, despite electric machine 108 losing a winding group and possibly producing a reduced torque.

The AC lines from each multi-phase inverter 400a, 400b, 400c, ..., 400n power different groups of machine windings of electric machine 108, and a total output voltage of electric machine 108 is combined inside of electric machine 108. Electric machine 108 may have a plurality of pole-pairs and a plurality of slots in each phase. Windings in these pole-pairs and slots can be split into several branches in accord with certain rules. Different branches may locate in different poles, or in the same pole, but different slots.

Two fundamental winding configurations suitable for electric machine 108 can be implemented for the windings of electric machine 108. In alternative embodiments, these two configurations can be combined and formed into a more complicated winding configuration and implemented for the windings of electric machine 108 as understood by a person of skill in the art. Referring to FIGS. 8 and 9, two winding groups are shown for the sake of simplification. Electric machine 108 includes N winding levels based on the number of the plurality of single converter modules. Machine manufacturers usually connect the machine windings in series, but the machine windings can be disconnected and reconnected into several winding groups. In an illustrative embodiment, individual machine winding groups have the same gauge, number of turns, and configuration as conventional ones.

Referring to FIG. 8, a first winding configuration 800 is shown. First winding configuration 800 includes first, first-phase machine winding 604a, first, second-phase machine winding 606a, first, third-phase machine winding 608a, second, first-phase machine winding 604b, second, second-phase machine winding 606b, and second, third-phase machine winding 608b with each winding positioned in one of a plurality of slots 802. First winding configuration 800 forms a three-phase, four-pole, and twelve slot (1 slot per pole per phase) winding configuration where the three-phase windings form different poles are separated and have their own neutral points indicated as first connector 610a, and second connector 610b.

Referring to FIG. 9, a second winding configuration 900 is shown. Second winding configuration 900 includes first, first-phase machine winding 604a, first, second-phase machine winding 606a, first, third-phase machine winding 608a, second, first-phase machine winding 604b, second, second-phase machine winding 606b, and second, third-phase machine winding 608b with each winding positioned in one of the plurality of slots 802. Second winding configuration 900 forms a three-phase, two-pole, and twelve slot (2 slots per pole per phase) winding configuration where the three-phase windings form different poles are separated and have their own neutral points indicated as first connector 610a and second connector 610b. If electric machine 108 has 2P poles with O slots per phase in each pole, the windings can be split into P·O segments. The windings can also be split into any factor of P·O segments, e.g., if P·O=6, the windings can be split into 1, 2, 3, or 6 segments.

Figure 10:
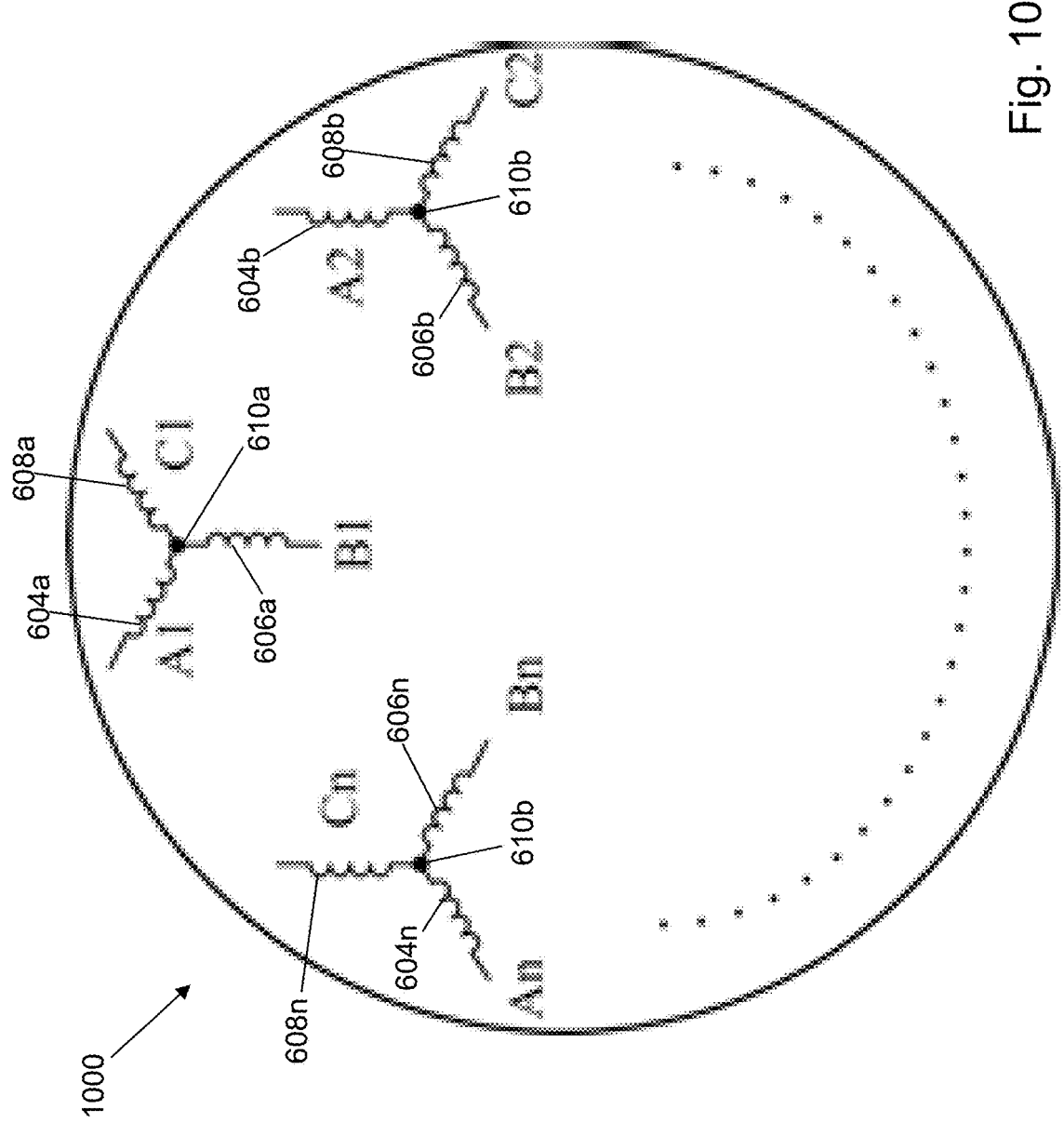
FIG. 10 depicts a general winding configuration of the electric machine system of FIG. 1 in accordance with an illustrative embodiment.

Referring to FIG. 10, a third winding configuration 1000 is shown. Third winding configuration 1000 includes first, first-phase machine winding 604a, first, second-phase machine winding 606a, first, third-phase machine winding 608a, second, first-phase machine winding 604b, second, second-phase machine winding 606b, second, third-phase machine winding 608b, Nth, first-phase machine winding 604n, Nth, second-phase machine winding 606n, and Nth, third-phase machine winding 608n. Each grouping of windings is separated and has its own neutral point.

Figure 11:
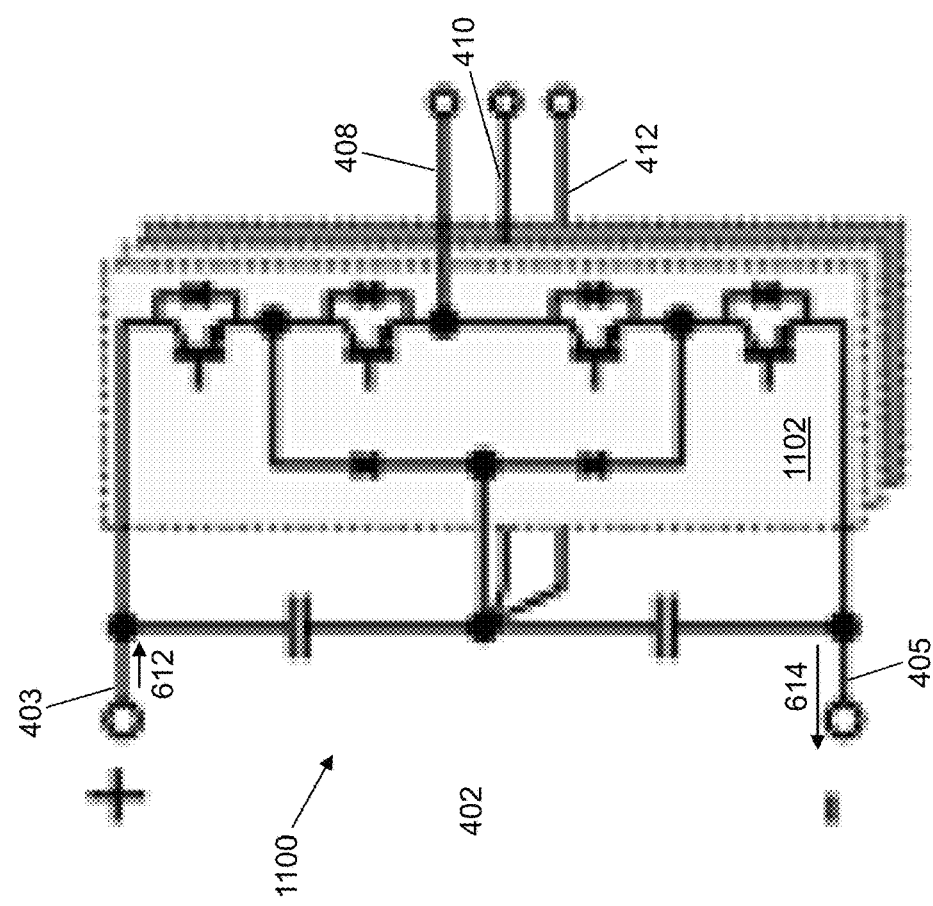
FIG. 11 depicts a second 3-phase inverter of the electric machine system of FIG. 1 in accordance with an illustrative embodiment.

Referring to FIG. 11, a block diagram of a second multi-phase inverter 1100 is shown in accordance with an illustrative embodiment. Second multi-phase inverter 1100 is similar to multi-phase inverter 400 except that each phase 1102 of second multi-phase inverter 1100 is formed using a neutral point clamped topology as understood by a person of skill in the art. Multi-level converter module 700 may be formed of a plurality of single converter modules based on second multi-phase inverter 1100.

Figure 12:
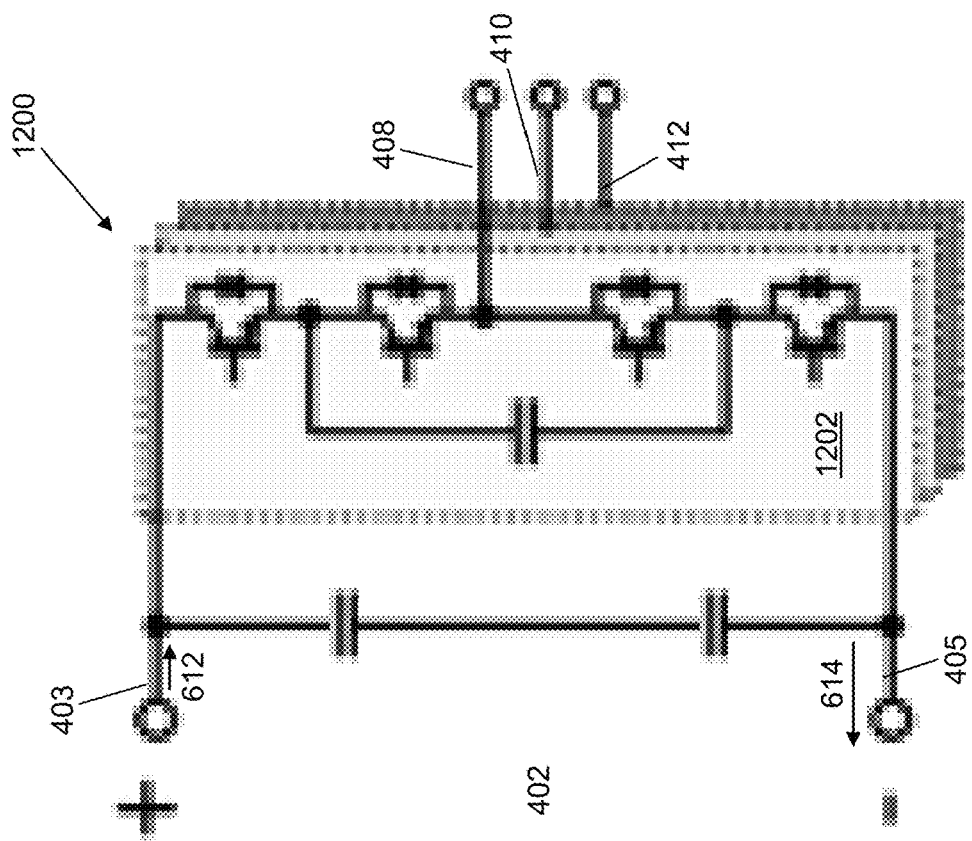
FIG. 12 depicts a third 3-phase inverter of the electric machine system of FIG. 1 in accordance with an illustrative embodiment.

Referring to FIG. 12, a block diagram of a third multi-phase inverter 1200 is shown in accordance with an illustrative embodiment. Third multi-phase inverter 1200 is similar to multi-phase inverter 400 except that each phase 1202 of third multi-phase inverter 1200 is formed using a flying capacitor topology as understood by a person of skill in the art. Multi-level converter module 700 may be formed of a plurality of single converter modules based on third multi-phase inverter 1200.

Figure 13:
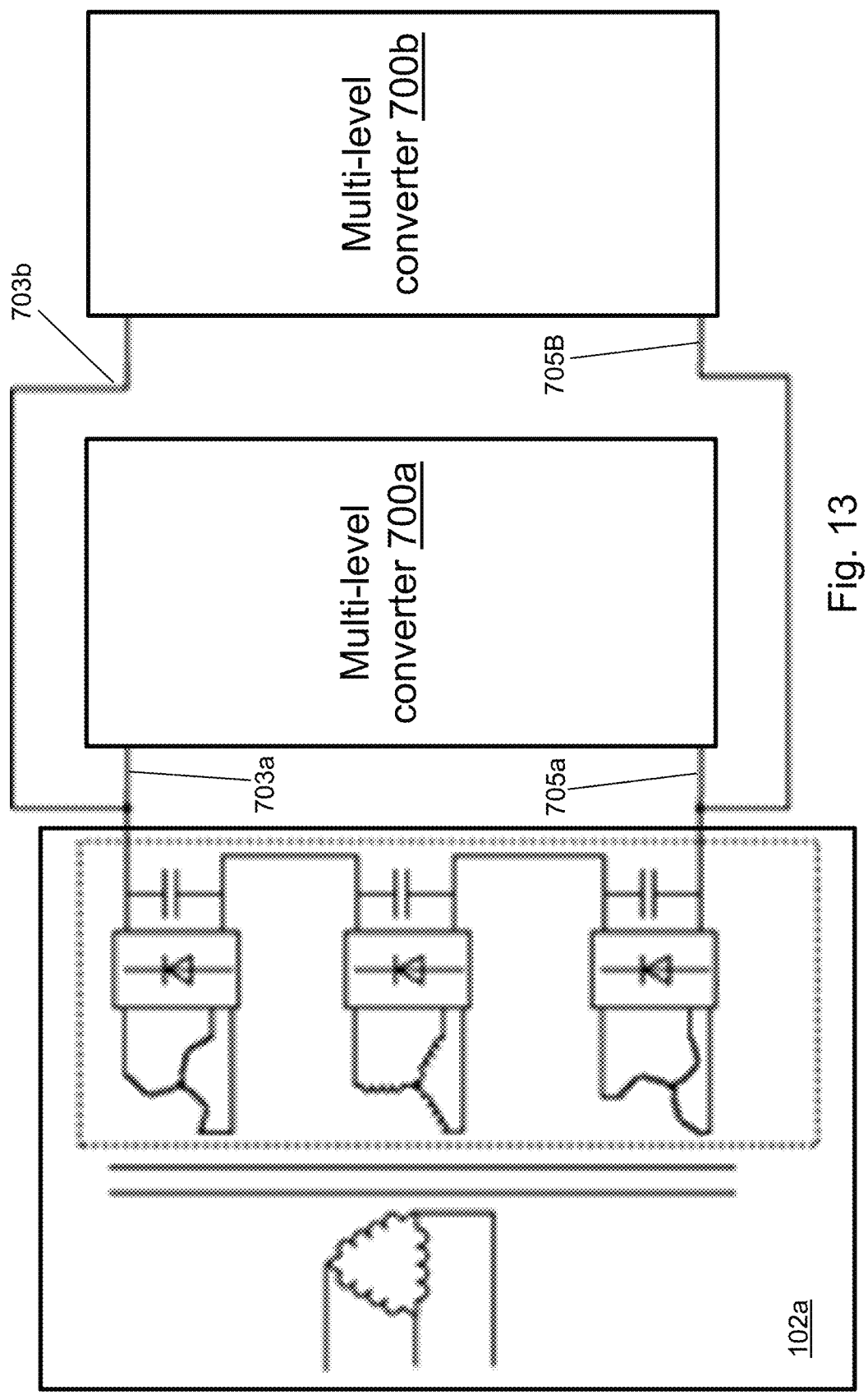
FIG. 13 depicts feeding of two electric machine systems of FIG. 1 in accordance with an illustrative embodiment.

Referring to FIG. 13, a first input source 102a is connected to provide a DC current to a first multi-level converter module 700a and to a second multi-level converter module 700b connected in parallel to first input source 102a. First multi-level converter module 700a drives a first electric machine (not shown). Second multi-level converter module 700b drives a second electric machine (not shown). A first overall positive line 703a is connected to provide a total input current to first multi-level converter module 700a. A second overall positive line 703b is connected to provide a total input current to second multi-level converter module 700b. A first overall negative line 705a is connected to provide a total output current from first multi-level converter module 700a. A second overall negative line 705b is connected to provide a total output current from second multi-level converter module 700b.

In the illustrative embodiment, first input source 102a may include a front-end rectifier separated from and shared by first multi-level converter module 700a and from second multi-level converter module 700b. The voltage rating, power rating, and the number of front-end rectifiers can be distinct from first multi-level converter module 700a and from second multi-level converter module 700b.

Figure 14:
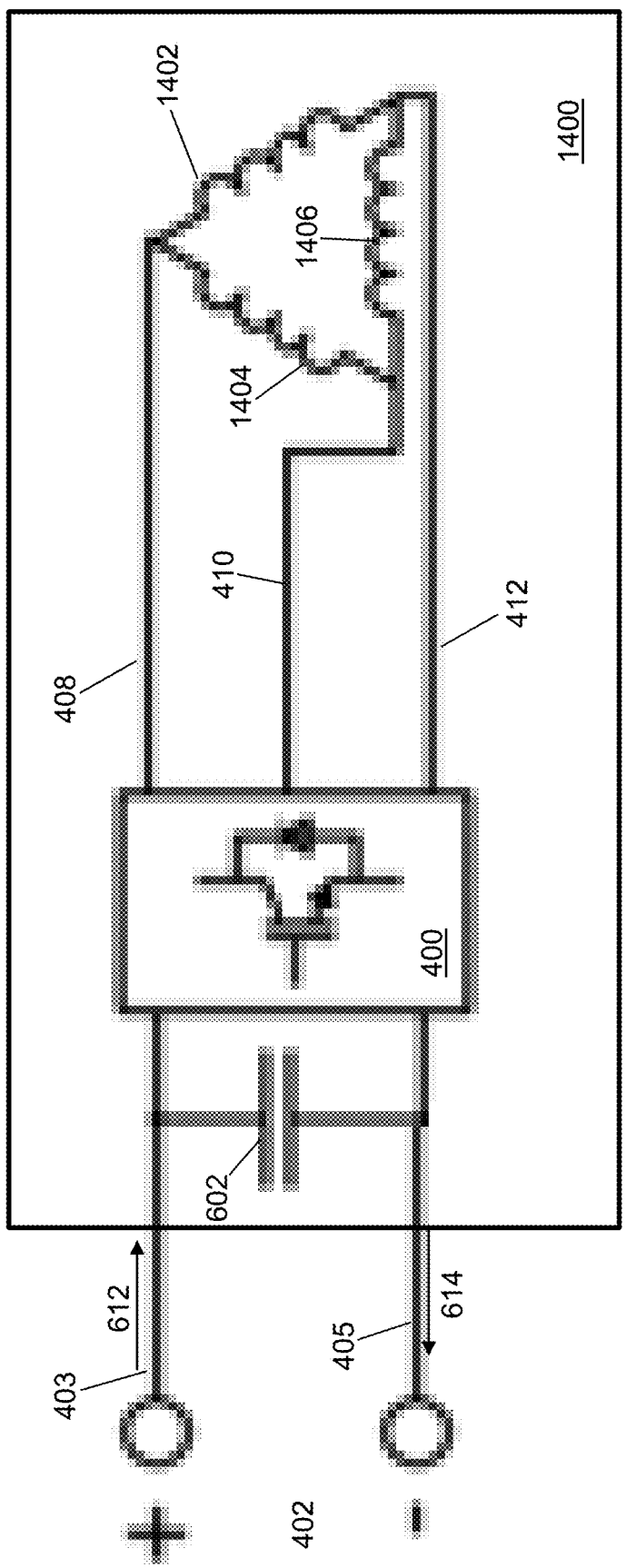
FIG. 14 depicts a single converter module with a Δ winding connection in accordance with an illustrative embodiment.

Referring to FIG. 14, a second single converter module 1400 is shown in accordance with an illustrative embodiment. Second single converter module 1400 may include capacitor 602, multi-phase inverter 400, a first-phase machine winding 1402, a second-phase machine winding 1404, and a third-phase machine winding 1406. First-phase machine winding 1402, second-phase machine winding 1404, and third-phase machine winding 1406 are alternative windings of electric machine 108. Unlike the Y-winding configuration of FIG. 6, first-phase machine winding 1402, second-phase machine winding 1404, and third-phase machine winding 1406 are configured in a Δ-winding configuration as understood by a person of skill in the art. First-phase machine winding 1402 is connected between first-phase line 408 and third-phase line 412. Second-phase machine winding 1404 is connected between first-phase line 408 and second-phase line 410. Third-phase machine winding 1406 is connected between second-phase line 410 and third-phase line 412. Any of the multi-level converter modules may be connected to electric machine 108 using a Δ-winding configuration instead of the Y-winding configuration of FIG. 6.

A gate signal interleaving technique can be used to reduce a ripple voltage in input voltage $V_{dc\text{-}tot}$ 702. Compared with a non-interleaving case, an input voltage and current ripple after interleaving has a higher frequency and a smaller amplitude. Thus interleaving supports the use of capacitor 602 having a smaller capacitance value, which stabilizes the DC-bus voltage and smoothes the input current, while maintaining the same amount of voltage/current ripple at the DC input. By shifting the gating signal to each single converter module 600 of multi-level converter module 700 by 360°/N, where N is the total number of modules, the module voltage ripple of each single converter module 600 is out of phase with each other and cancels out. The total voltage ripple amplitude is reduced and the equivalent frequency is at most N times the switching frequency.

The magnetic coupling between different winding groups influences an output current ripple of multi-level converter module 700. The current ripple of a larger, negative coupling factor is less than the current ripple of a small, negative coupling factor, which is less than the current ripple of a zero coupling factor, which is less than the current ripple of a small, positive coupling factor, which is less than the current ripple of a large positive coupling factor. First winding configuration 800 benefits from the interleaving technique because it has a negative coupling factor. When the coupling factor is positive and not negligible, as may be the case for second winding configuration 900, interleaving should also consider a leakage inductance or the ripple current may be increased instead of decreased.

Figure 15:
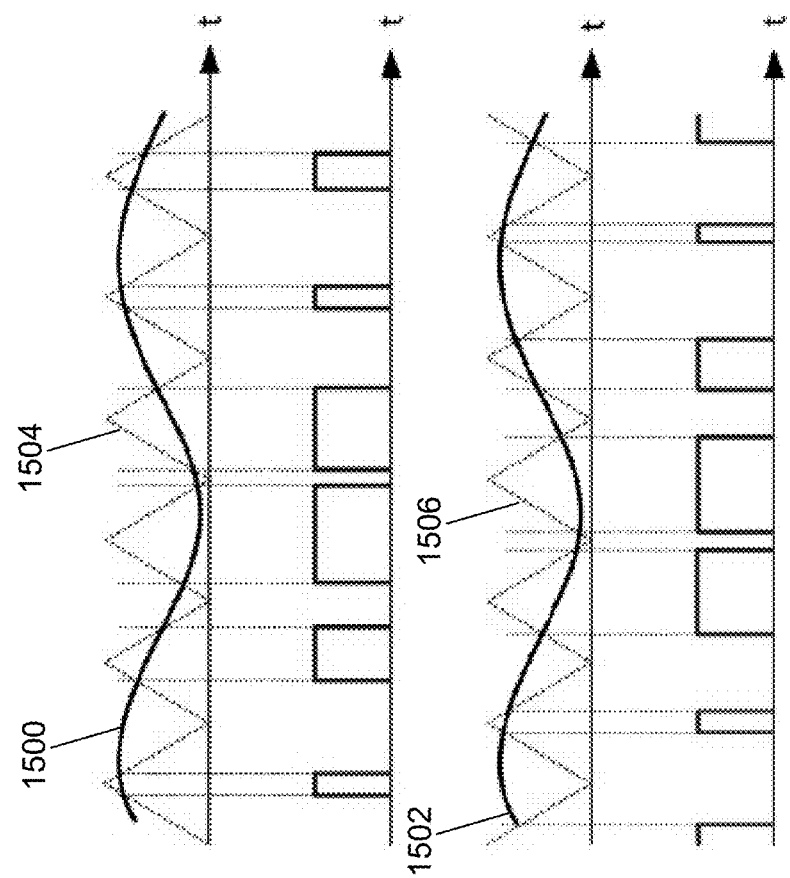
FIG. 15 shows a phase shifted signal input to a two-level converter in accordance with an illustrative embodiment.

Referring to FIG. 15, a first duty ratio command 1500 in an αβ coordinate reference frame for first single converter module 600a and a second duty ratio command 1502 in the αβ coordinate reference frame for second single converter module 600b are identical, meaning that the output waveforms have the same fundamental frequency and amplitude. A first triangular carrier waveform 1504 of first single converter module 600a and a second triangular carrier waveform 1506 of second single converter module 600b are shifted by 180 degrees (360°/N, where N is the total number of modules). After the output voltage waveforms are added up, the second order harmonics and part of the higher order harmonics are canceled.

As discussed previously, multi-level converter 700 includes a plurality of single converter modules that are connected in series and drive machine windings independently. In a normal condition, the windings are balanced and consume the same amount of real power. Any mismatches between electric machine 108 and the modules of multi-level converter 700 may result in machine windings that have different electric properties causing DC input voltage $V_{dc}$ 402 across the plurality of single converter modules to be unequal. To prevent this from happening, a control module may be applied to balance the input voltages. The voltages of series-connected capacitors may be balanced by passive resistors, which are in parallel with the capacitors.

Figure 16:
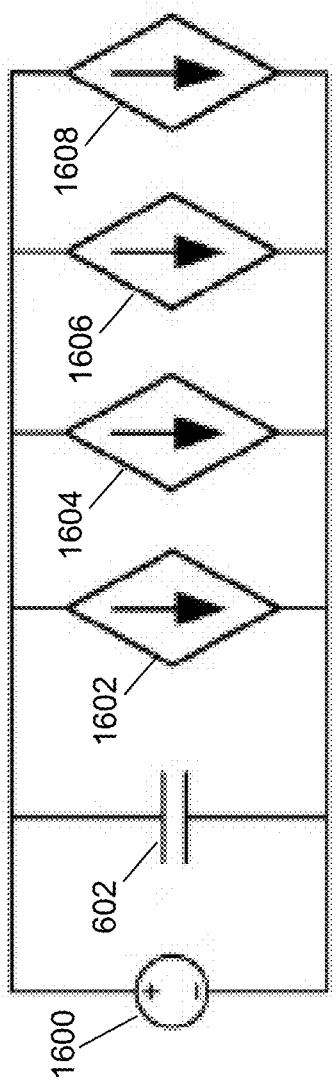
FIG. 16 depicts a small signal model of the 3-phase inverter of FIG. 4 in accordance with an illustrative embodiment.

Referring to FIG. 16, an input small signal model for a three-phase inverter, where $\tilde{V}_g$ 1600 is an unbalanced voltage error. The input small signal model includes four parallel circuit components, a first component 1602 equal to $3/2\Delta D_d I_d$, a second component 1604 $3/2\Delta D_q I_q$, a third component 1606 $3/2\Delta I_q D_q$, and a fourth component 1608 $3/2\Delta I_d D_d$, where the subscript 'd' references a direct axis component in a rotating direct-quadrature (d-q) coordinate reference frame, the subscript 'q' references a quadrature axis component in the rotating d-q coordinate reference frame, 'I' references a current, and 'D' references a duty ratio command such as duty ratio command 1500. As in standard practice, the q-axis is assumed to be the axis containing the voltage vector $\tilde{V}_g$, and the current in this direction is the real power component. The d-axis contains the component of the current normal to the voltage vector $\tilde{V}_g$, and is the axis of the reactive power component. The small signal of current can be neglected because the current loop has a much slower dynamic response than a voltage balance resistor. As a result, third component 1606 $3/2\Delta I_q D_q$, and fourth component 1608 $3/2\Delta I_d D_d$ can be assumed to be zero.

Figure 17:
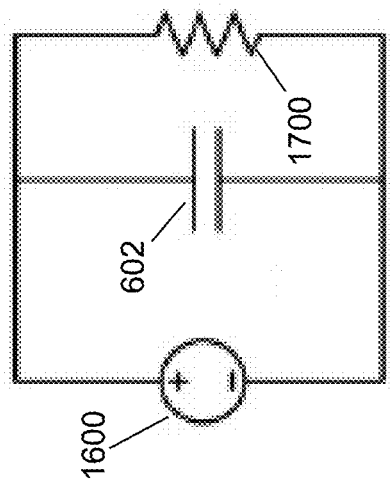
FIG. 17 depicts an equivalent small signal model of the 3-phase inverter of FIG. 4 with an active voltage balance virtual resistor in accordance with an illustrative embodiment.
Figure 18:
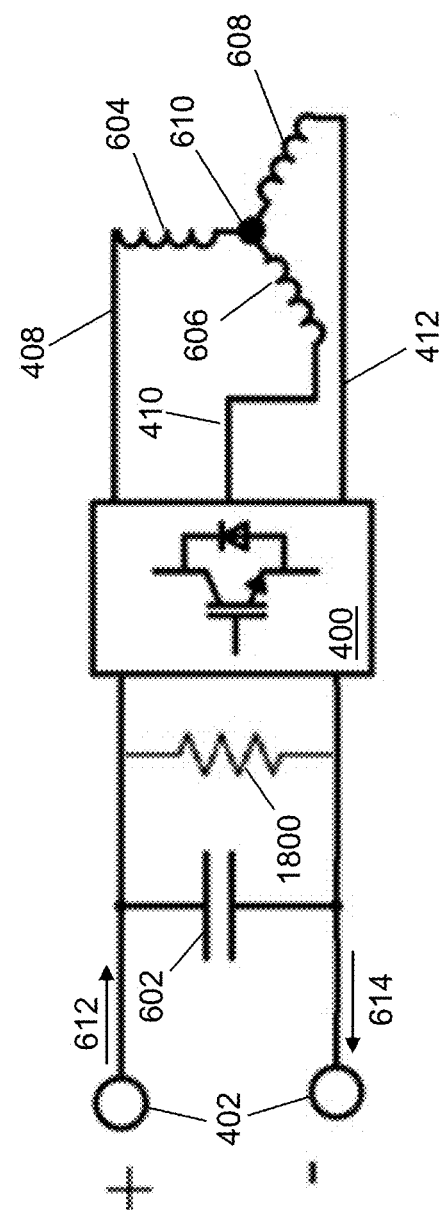
FIG. 18 depicts the 3-phase inverter of FIG. 4 with a voltage balance resistor in accordance with an illustrative embodiment.

To realize an active balance resistor, a duty ratio is manipulated to create a balancing current that is equivalent to a current consumed by a virtual resistor 1700 as shown with reference to FIG. 17. In the control module, virtual resistor 1700 can be programmed to have a resistance value $R_a$. To achieve the same balancing results as virtual resistor 1700, the equation $$\frac{\tilde{V}_g}{R_a} = \frac{3}{2}\Delta D_d I_d + \frac{3}{2}\Delta D_q I_q$$

is satisfied. Referring to FIG. 18, single converter module 600 is shown with a resistor 1800 that may be a passive (real) resistor or virtual (active) resistor 1700 mounted in parallel across the inputs of multi-phase inverter 400.

Figure 19:
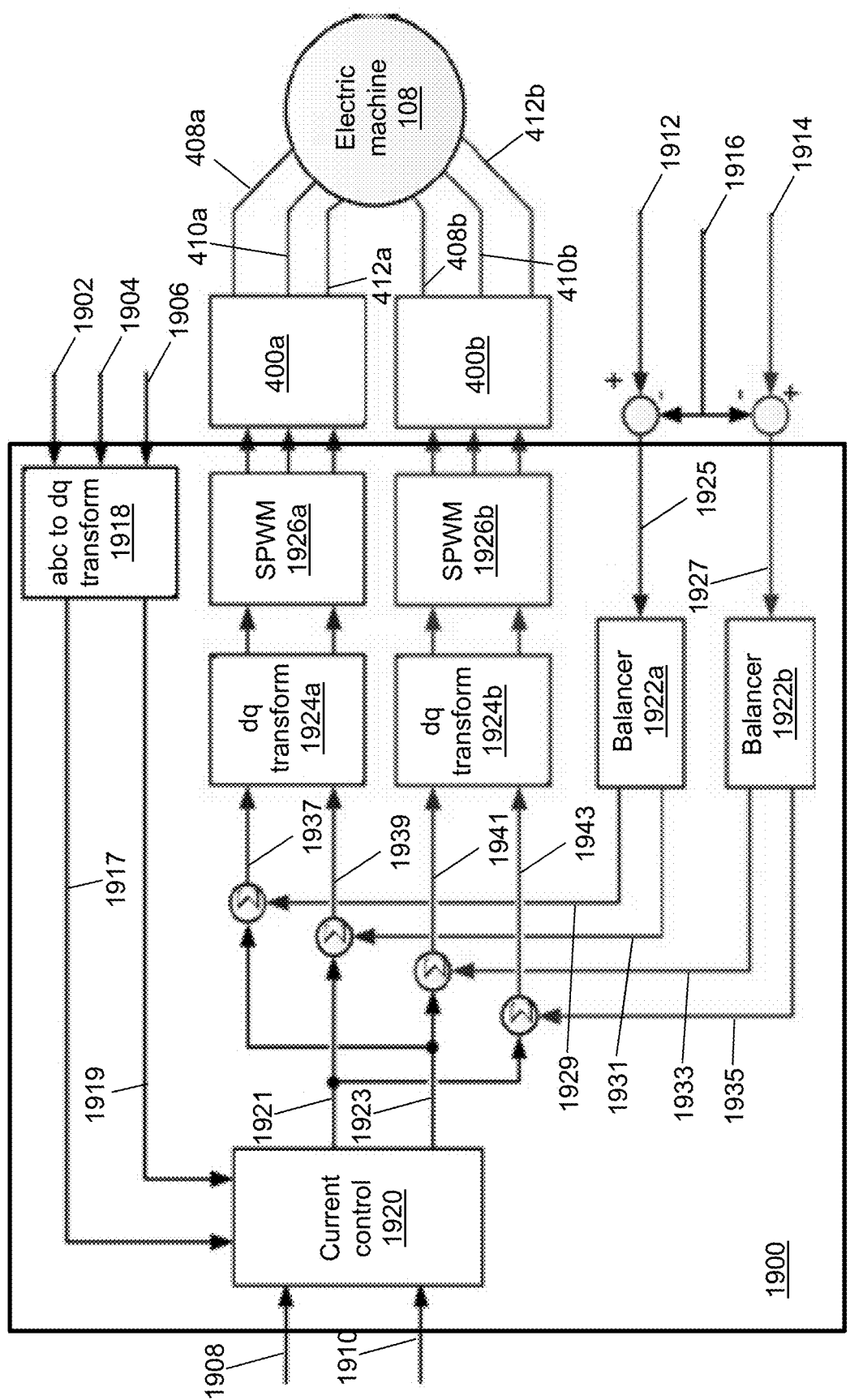
FIG. 19 depicts a block diagram of an active balancer controller of a two-level converter in accordance with an illustrative embodiment.

Referring to FIG. 19, a control module 1900 is shown in accordance with an illustrative embodiment. Control module 1900 implements an actively controlled virtual resistor to balance the module voltage. Merely for illustration, control module 1900 is an example for a two-level converter. Control module 1900 implements active voltage balance control allowing it to perform like resistor 1800 shown in FIG. 18. Resistor 1800 can be programmed to a desired value. Control module 1900 generates updated values for $$\Delta D_d = \frac{\tilde{V}_g}{\frac{3}{2}R_a\sqrt{I_d^2 + I_q^2}} I_d$$

and for $$\Delta D_q = \frac{\tilde{V}_g}{\frac{3}{2}R_a\sqrt{I_d^2 + I_q^2}} I_q,$$

where $\Delta D_d^2 + \Delta D_q^2$ is minimum.

Inputs to control module 1900 include a summed first-phase current $I_{ta}$ 1902, a summed second-phase current $I_{tb}$ 1904, and a summed third-phase current $I_{tc}$ 1906. Summed first-phase current $I_{ta}$ 1902 is a summation of the currents measured in first, first-phase line 408a, second, first-phase line 408b, third, first-phase line 408c, ..., Nth, first-phase line 408n. Summed second-phase current $I_{tb}$ 1904 is a summation of the currents measured in first, second-phase line 410a, second, second-phase line 410b, third, second-phase line 410c, ..., Nth, second-phase line 410n. Summed third-phase current $I_{tc}$ 1906 is a summation of the currents measured in first, third-phase line 412a, second, third-phase line 412b, third, third-phase line 412c, ..., Nth, third-phase line 412n. Summed first-phase current $I_{ta}$ 1902, summed second-phase current $I_{tb}$ 1904, and summed third-first phase current $I_{tc}$ 1906 are input to abc-to-d-q transform 1918 that converts the summed phase currents to the rotating d-q coordinate reference frame. Outputs from abc-to-d-q transform 1918 are a d measured current $I_{dm}$ 1917 and a q measured current $I_{qm}$ 1919. d measured current $I_{dm}$ 1917 and q measured current $I_{qm}$ 1919 are input to a current control 1920.

Inputs to control module 1900 further include a d reference current $I_d$ 1908 and a q reference current $I_q$ 1910. d reference current $I_d$ 1908 and q reference current $I_q$ 1910 are input to current control 1920 as command inputs. Current control 1920 calculates $I_{derr}=I_d-I_{dm}$ and inputs the resulting $I_{derr}$ into a first proportional-integral (PI) controller to generate a d-axis signal value that is compensated by a state feedback decoupling value determined based on a speed of electric machine 108 and a cross-coupling between the d-axis and q-axis. The compensated d-axis signal value is a d-axis voltage command, d voltage $V_d$ 1921, output from current control 1920. Current control 1920 also calculates $I_{qerr}=I_q-I_{qm}$ and inputs the resulting $I_{qerr}$ into a second PI controller to generate a q-axis signal value that is compensated by the state feedback decoupling value determined based on the speed of electric machine 108 and the cross-coupling between the d-axis and q-axis. The compensated q-axis signal value is a q-axis voltage command, q voltage $V_q$ 1923, output from current control 1920.

Inputs to control module 1900 further include a first output voltage $V_1$ 1912 of first multi-phase inverter 400a, a second output voltage $V_2$ 1914 of second multi-phase inverter 400b, and a reference voltage $V_r$ 1916. First output voltage $V_1$ 1912 is first $V_{dc}$ 402a. Second output voltage $V_2$ 1914 is second $V_{dc}$ 402b. A first difference voltage 1925 is calculated as $\tilde{V}_{g1}=V_1-V_r$ and input to first active balancer 1922a. A second difference voltage 1927 is calculated as $\tilde{V}_{g2}=V_2-V_r$ and input to second active balancer 1922b.

Outputs from first active balancer 1922a are a first d difference voltage $\Delta V_{d1}$ 1929 and a first q difference voltage $\Delta V_{q1}$ 1931. Outputs from second active balancer 1922b are a second d difference voltage $\Delta V_{d2}$ 1933 and a second q difference voltage $\Delta V_{q2}$ 1935. $\Delta V_{d1}=\Delta D_{d1}*k_1$ and $\Delta V_{q1}=\Delta D_{q1}*k_1$, where $k_1$ is a constant that may be determined based on first $V_{dc}$ 402a and a modulation method as understood by a person of skill in the art. $\Delta V_{d2}\Delta D_{d2}*k_2$ and $\Delta V_{q2}=\Delta D_{q2}*k_2$, where $k_2$ is a constant that may be determined based on second $V_{dc}$ 402b and the modulation method.

A first desired d voltage 1937 is calculated as $V_{dd}=V_d+\Delta V_{d1}$ and input to a first d-q transform 1924a. A first desired q voltage 1939 is calculated as $V_{qd}=V_q+\Delta V_{q1}$ and input to first d-q transform 1924a. First d-q transform 1924a converts first desired d voltage 1937 and first desired q voltage 1939 from the rotating d-q coordinate reference frame to a stationary d-q coordinate reference frame and inputs these voltages to a first sinusoidal pulse-width modulation (SPWM) modulator 1926b. First SPWM modulator 1926b translates the voltage duty cycle in the stationary d-q coordinate reference frame to a gating signal input to first multi-phase inverter 400a.

A second desired d voltage 1941 is calculated as $V_{dd}=V_d+\Delta V_{d2}$ and input to a second d-q transform 1924b. A second desired q voltage 1943 is calculated as $V_{qd}=V_q+\Delta V_{q2}$ and input to second d-q transform 1924b. Second d-q transform 1924b converts second desired d voltage 1941 and second desired q voltage 1943 from the rotating d-q coordinate reference frame to the stationary d-q coordinate reference frame and inputs these voltages to a second SPWM modulator 1926b. Second SPWM modulator 1926b translates the voltage duty cycle in the stationary d-q coordinate reference frame to a gating signal input to second multi-phase inverter 400b.

Figure 20:
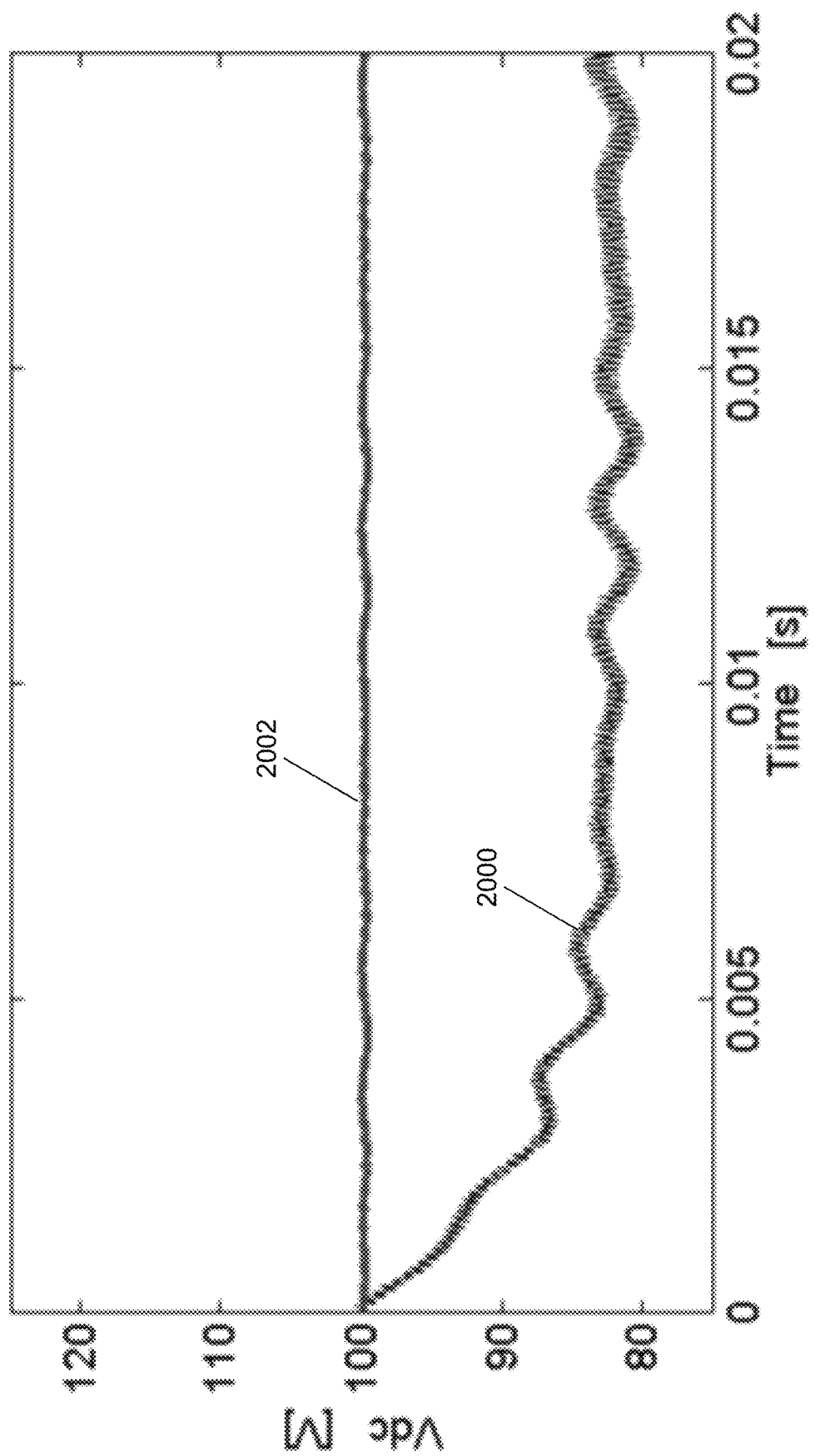
FIG. 20 shows a voltage comparison of with and without the active balancer controller of the two-level converter of FIG. 19 in accordance with an illustrative embodiment.

Referring to FIG. 20, a simulated voltage comparison with and without control module 1900 is shown in accordance with an illustrative embodiment. In the simulation, the machine windings of first multi-phase inverter 400a have an unbalanced load, which causes the module DC input voltages to be out of balance. Without an active balancer, first multi-phase inverter 400a has the same duty ratio as second multi-phase inverter 400b. Since the loads are different, the load current of first multi-phase inverter 400a is larger than that of second multi-phase inverter 400b. The DC input voltage of first multi-phase inverter 400a drops until the load current is as the same as the load current in second multi-phase inverter 400b as shown by a first curve 2000. First curve 2000 shows the DC input voltage of first multi-phase inverter 400a without control module 1900. With control module 1900, equal DC-bus voltages on first multi-phase inverter 400a and on second multi-phase inverter 400b are maintained as shown by a second curve 2002. Second curve 200s shows the DC input voltage of first multi-phase inverter 400a with control module 1900.

Referring to FIG. 21, a block diagram of controller 104 is shown in accordance with an illustrative embodiment. Controller 104 may include an input interface 2100, an output interface 2102, a computer-readable medium 2104, a processor 2106, and a control application 2108. Fewer, different, and additional components may be incorporated into controller 104. Controller 104 further may include electrical circuit components connected to processor 2106 and/or computer-readable medium 2104.

Input interface 2100 provides an interface for receiving information from the user or from other devices for entry into controller 104 as understood by those skilled in the art. Input interface 2100 may interface with various input technologies including, but not limited to, a keyboard, a mouse, a display, a track ball, a keypad, one or more buttons, etc. to allow the user to enter information into controller 104 or to make selections in a user interface displayed on the display. The same interface may support both input interface 2100 and output interface 2102. For example, a touch screen display supports user input and presents output to the user.

Controller 104 may have one or more input interfaces that use the same or a different input interface technology. Additional inputs to controller 104 may be summed first phase current $I_{ta}$ 1902, summed second phase current $I_{tb}$ 1904, third first phase current $I_{tc}$ 1906, d reference current $I_d$ 1908, q reference current $I_q$ 1910, first output voltage $V_1$ 1912 of first multi-phase inverter 400a, second output voltage $V_2$ 1914 of second multi-phase inverter 400b, and reference voltage $V_r$ 1916.

Output interface 2102 provides an interface for outputting information for review by a user of controller 104 and for input to another device. For example, output interface 2102 may interface with various output technologies including, but not limited to, the display and a printer, etc. Controller 104 may have one or more output interfaces that use the same or a different interface technology. Additional outputs from controller 104, as discussed above, include.

Computer-readable medium 2104 is an electronic holding place or storage for information so the information can be accessed by processor 2106 as understood by those skilled in the art. Computer-readable medium 2104 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, cache memory, etc. Controller 104 may have one or more computer-readable media that use the same or a different memory media technology. Controller 104 also may have one or more drives that support the loading of a memory media such as a CD or DVD.

Processor 2106 executes instructions as understood by those skilled in the art. The instructions may be carried out by a special purpose computer, logic circuits, or hardware circuits. Processor 2106 may be implemented in hardware and/or firmware, or any combination of these methods. The term "execution" is the process of running an application or the carrying out of the operation called for by an instruction. The instructions may be written using one or more programming language, scripting language, assembly language, etc. Processor 2106 executes an instruction, meaning it performs/controls the operations called for by that instruction. Processor 2106 operably couples with input interface 2100, with output interface 2102, and with computer-readable medium 2104 to receive, to send, and to process information. Processor 2106 may retrieve a set of instructions from a permanent memory device and copy the instructions in an executable form to a temporary memory device that is generally some form of RAM. Controller 104 may include a plurality of processors that use the same or a different processing technology.

Control application 2108 performs operations associated with implementing some or all of the closed loop control system as described with reference to FIG. 19. The operations may be implemented using hardware, firmware, software, or any combination of these methods. Referring to the example embodiment of FIG. 21, control application 2108 is implemented in software (comprised of computer-readable and/or computer-executable instructions) stored in computer-readable medium 2104 and accessible by processor 2106 for execution of the instructions that embody the operations of control application 2108. Control application 2108 may be written using one or more programming languages, assembly languages, scripting languages, etc.

As used in this disclosure, the term "connect" includes join, unite, mount, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "connected on" and "connected to" include any interior or exterior portion of the element referenced. These phrases also encompass direct connection (in which the referenced elements are in direct contact) and indirect connection (in which the referenced elements are not in direct contact, but are mounted together via intermediate elements). Elements referenced as connected to each other herein may further be integrally formed together. As a result, elements described herein as being connected to each other need not be discrete structural elements. The elements may be connected permanently, removably, or releasably.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A converter comprising:
   a first multi-phase inverter comprising
      a first plurality of switch-diode circuits for each phase of the first multi-phase inverter;
      a first direct current (DC) positive line;
      a first DC negative line, wherein the first plurality of switch-diode circuits are connected between the first DC positive line and the first DC negative line; and
      a first plurality of alternating current (AC) lines, wherein a first end of each AC line of the first plurality of AC lines is connected between a pair of the first plurality of switch-diode circuits for a respective phase of each AC line of the first plurality of AC lines, wherein each AC line of the first plurality of AC lines is configured to be connected at a second end to a single phase winding of an electric machine;
   a second multi-phase inverter comprising
      a second plurality of switch-diode circuits for each phase of the second multi-phase inverter;
      a second DC positive line;
      a second DC negative line, wherein the second plurality of switch-diode circuits are connected between the second DC positive line and the second DC negative line; and
      a second plurality of AC lines, wherein a first end of each AC line of the second plurality of AC lines is connected between a pair of the second plurality of switch-diode circuits for a respective phase of each AC line of the second plurality of AC lines, wherein each AC line of the second plurality of AC lines is configured to be connected at a second end to a second single phase winding of the electric machine;
   a first voltage balance control resistor connected in parallel with the first multi-phase inverter between the first DC positive line and the first DC negative line;
   a first capacitor connected in parallel with the first multi-phase inverter between the first DC positive line and the first DC negative line;
   a second voltage balance control resistor connected in parallel with the second multi-phase inverter between the second DC positive line and the second DC negative line; and
   a second capacitor connected in parallel with the second multi-phase inverter between the second DC positive line and the second DC negative line,
   wherein the first DC negative line is electrically coupled to the second DC positive line to connect the first multi-phase inverter and the second multi-phase inverter in series,
   wherein each phase of the first multi-phase inverter is a first multilevel inverter, and each phase of the second multi-phase inverter is a second multilevel inverter.

2. The converter of claim 1, wherein a number of the first plurality of AC lines is three, wherein a first AC line of the first plurality of AC lines is configured to be connected to a first phase winding of the electric machine, wherein a second AC line of the first plurality of AC lines is configured to be connected to a second phase winding of the electric machine, and wherein a third AC line of the first plurality of AC lines is configured to be connected to a third phase winding of the electric machine.

3. The converter of claim 1, wherein a phase of a current input to the second multi-phase inverter is shifted relative to a current input to the first multi-phase inverter.

4. The converter of claim 3, wherein the phase is determined based on a number of multi-phase inverters forming the converter.

5. The converter of claim 1, wherein the first multilevel inverter of each phase is a neutral point clamped inverter, and the second multilevel inverter of each phase is a second neutral point clamped inverter.

6. The converter of claim 1, wherein the first multilevel inverter of each phase is a flying capacitor inverter, and the second multilevel inverter of each phase is a second flying capacitor inverter.

7. The converter of claim 1, wherein the first DC positive line and the second DC negative line are configured for connection to a single input voltage source.

8. The converter of claim 1, further comprising:
   a third multi-phase inverter comprising
      a third plurality of switch-diode circuits for each phase of the third multi-phase inverter;
      a third DC positive line;
      a third DC negative line, wherein the third plurality of switch-diode circuits are connected between the third DC positive line and the third DC negative line; and
      a third plurality of AC lines, wherein a first end of each AC line of the third plurality of AC lines is connected between a pair of the third plurality of switch-diode circuits for a respective phase of each AC line of the third plurality of AC lines, wherein each AC line of the third plurality of AC lines is configured to be connected at a second end to a third single phase winding of the electric machine; and a third capacitor connected in parallel with the third multi-phase inverter between the third DC positive line and the third DC negative line, wherein the second DC negative line is electrically coupled to the third DC positive line to connect the second multi-phase inverter and the third multi-phase inverter in series.

9. The converter of claim 8, wherein the first DC positive line and the third DC negative line are configured for connection to a single input voltage source.

10. A converter comprising:
a first multi-phase inverter comprising
a first plurality of switch-diode circuits for each phase of the first multi-phase inverter;
a first direct current (DC) positive line;
a first DC negative line, wherein the first plurality of switch-diode circuits are connected between the first DC positive line and the first DC negative line; and
a first plurality of alternating current (AC) lines, wherein a first end of each AC line of the first plurality of AC lines is connected between a pair of the first plurality of switch-diode circuits for a respective phase of each AC line of the first plurality of AC lines, wherein each AC line of the first plurality of AC lines is configured to be connected between a different pair of single phase windings of an electric machine;
a second multi-phase inverter comprising
a second plurality of switch-diode circuits for each phase of the second multi-phase inverter;
a second DC positive line;
a second DC negative line, wherein the second plurality of switch-diode circuits are connected between the second DC positive line and the second DC negative line; and
a second plurality of AC lines, wherein a first end of each AC line of the second plurality of AC lines is connected between a pair of the second plurality of switch-diode circuits for a respective phase of each AC line of the second plurality of AC lines, wherein each AC line of the second plurality of AC lines is configured to be connected between a different pair of second single phase windings of the electric machine;
a first capacitor connected in parallel with the first multi-phase inverter between the first DC positive line and the first DC negative line; and
a second capacitor connected in parallel with the second multi-phase inverter between the second DC positive line and the second DC negative line,
wherein the first DC negative line is electrically coupled to the second DC positive line to connect the first multi-phase inverter and the second multi-phase inverter in series,
wherein each phase of the first multi-phase inverter is a first multilevel inverter, and each phase of the second multi-phase inverter is a second multilevel inverter.

11. The converter of claim 10, wherein a number of the first plurality of AC lines is three, wherein a first AC line of the first plurality of AC lines is configured to be connected between a first phase winding of the electric machine and a second phase winding of the electric machine, wherein a second AC line of the first plurality of AC lines is configured to be connected between the first phase winding of the electric machine and a third phase winding of the electric machine, and wherein a third AC line of the first plurality of AC lines is configured to be connected between the third phase winding of the electric machine and the second phase winding of the electric machine.

12. The converter of claim 10, wherein a phase of a current input to the second multi-phase inverter is shifted relative to a current input to the first multi-phase inverter.

13. The converter of claim 10, wherein the first multilevel inverter of each phase is a neutral point clamped inverter, and the second multilevel inverter of each phase is a second neutral point clamped inverter.

14. The converter of claim 10, wherein the first multilevel inverter of each phase is a flying capacitor inverter, and the second multilevel inverter of each phase is a second flying capacitor inverter.

15. The converter of claim 10, wherein the first DC positive line and the second DC negative line are configured for connection to a single input voltage source.

16. An electric machine system comprising:
an electric machine comprising
a stator;
a rotor configured to rotate; and
at least four windings, wherein a first winding is connected between a first-phase line and a first neutral connector, a second winding is connected between a second-phase line and the first neutral connector, a third winding is connected between a second first-phase line and a second neutral connector, a fourth winding is connected between a second second-phase line and the second neutral connector, wherein the first neutral connector is different from the second neutral connector;
a first multi-phase inverter comprising
a first plurality of switch-diode circuits for each phase of the first multi-phase inverter;
a first direct current (DC) positive line;
a first DC negative line, wherein the first plurality of switch-diode circuits are connected between the first DC positive line and the first DC negative line; and
at least the first-phase line and the second-phase line, wherein a first end of the first-phase line is connected between a first pair of the first plurality of switch-diode circuits for a respective phase of the first-phase line, and a first end of the second-phase line is connected between a second pair of the first plurality of switch-diode circuits for a respective phase of the second-phase line;
a second multi-phase inverter comprising
a second plurality of switch-diode circuits for each phase of the second multi-phase inverter;
a second DC positive line;
a second DC negative line, wherein the second plurality of switch-diode circuits are connected between the second DC positive line and the second DC negative line; and
at least the second first-phase line and the second second-phase line, wherein a first end of the second first-phase line is connected between a first pair of the second plurality of switch-diode circuits for a respective phase of the second first-phase line, and a first end of the second second-phase line is connected between a first pair of the second plurality of switch-diode circuits for a respective phase of the second second-phase line;
a first capacitor connected in parallel with the first multi-phase inverter between the first DC positive line and the first DC negative line; and a second capacitor connected in parallel with the second multi-phase inverter between the second DC positive line and the second DC negative line, wherein the first DC negative line is electrically coupled to the second DC positive line such that the first multi-phase inverter and the second multi-phase inverter are connected in series, wherein each phase of the first multi-phase inverter is a first multilevel inverter, and each phase of the second multi-phase inverter is a second multilevel inverter.

17. The electric machine system of claim 16, wherein the first DC positive line and the second DC negative line are configured for connection to a single input voltage source.

18. The electric machine system of claim 16, further comprising:
 a fifth winding is connected between a third first-phase line and a third neutral connector, a sixth winding is connected between a third second-phase line and the third neutral connector, wherein the third neutral connector is different from the first neutral connector and from the second neutral connector;
 a third multi-phase inverter comprising
  a third plurality of switch-diode circuits for each phase of the third multi-phase inverter;
  a third DC positive line;
  a third DC negative line, wherein the third plurality of switch-diode circuits are connected between the third DC positive line and the third DC negative line; and
  a third plurality of AC, wherein a first end of the third first-phase line is connected between a first pair of the third plurality of switch-diode circuits for a respective phase of the third first-phase line, and a first end of the third second-phase line is connected between a first pair of the third plurality of switch-diode circuits for a respective phase of the third second-phase line; and
 a third capacitor connected in parallel with the third multi-phase inverter between the third DC positive line and the third DC negative line;
 wherein the second DC negative line is electrically coupled to the third DC positive line to connect the second multi-phase inverter and the third multi-phase inverter in series,
 wherein the first DC positive line and the third DC negative line are configured for connection to a single input voltage source.

* * * * *

UNITED STATES PATENT AND TRADEMARK OFFICE
CERTIFICATE OF CORRECTION

| | | |
|---|---|---|
| PATENT NO. | : 11,063,531 B2 | Page 1 of 1 |
| APPLICATION NO. | : 14/181085 | |
| DATED | : July 13, 2021 | |
| INVENTOR(S) | : Yehui Han et al. | |

It is certified that error appears in the above-identified patent and that said Letters Patent is hereby corrected as shown below:

In the Specification

Column 12, Line 44:
Delete the phrase "$I_{qerr} = I_a - I_{qm}$" and replace with --$I_{qerr} = I_q - I_{qm}$--.

In the Claims

Claim 1, Column 15, Line 41:
Delete the phrase "of the first multi-phase inverter:" and replace with --of the first multi-phase inverter;--.

Claim 10, Column 17, Line 14:
Delete the phrase "of the first multi-phase inverter:" and replace with --of the first multi-phase inverter;--.

Signed and Sealed this
Twenty-eighth Day of June, 2022

Katherine Kelly Vidal
*Director of the United States Patent and Trademark Office*